United States Patent
Eliashberg et al.

(10) Patent No.: US 8,661,001 B2
(45) Date of Patent: *Feb. 25, 2014

(54) DATA EXTRACTION FOR FEED GENERATION

(75) Inventors: Vitaly Eliashberg, Sunnyvale, CA (US); Hilding Mark Carlson, Portola Valley, CA (US)

(73) Assignee: Simplefeed, Inc., Los Altos, CA (US)

( * ) Notice: Subject to any disclaimer, the term of this patent is extended or adjusted under 35 U.S.C. 154(b) by 1105 days.

This patent is subject to a terminal disclaimer.

(21) Appl. No.: 11/340,942

(22) Filed: Jan. 26, 2006

(65) Prior Publication Data
US 2006/0167860 A1    Jul. 27, 2006

Related U.S. Application Data

(63) Continuation-in-part of application No. 11/129,634, filed on May 13, 2005, now Pat. No. 8,065,383.

(60) Provisional application No. 60/572,174, filed on May 17, 2004, provisional application No. 60/615,005, filed on Sep. 30, 2004.

(51) Int. Cl.
    *G06F 17/30*        (2006.01)

(52) U.S. Cl.
    USPC .......................................... 707/694; 707/809

(58) Field of Classification Search
None
See application file for complete search history.

(56) References Cited

U.S. PATENT DOCUMENTS

| | | | |
|---|---|---|---|
| 6,330,592 B1 | 12/2001 | Makuch et al. | |
| 6,539,377 B1 | 3/2003 | Culliss | |
| 6,671,715 B1 | 12/2003 | Langseth et al. | |
| 6,766,362 B1 | 7/2004 | Miyasaka et al. | |
| 7,013,325 B1 | 3/2006 | Vivian et al. | |
| 7,134,073 B1 * | 11/2006 | Fiedorowicz et al. | 715/235 |
| 7,568,148 B1 * | 7/2009 | Bharat et al. | 715/200 |
| 2002/0071593 A1 * | 6/2002 | Muratani | 382/100 |
| 2002/0091818 A1 * | 7/2002 | Cascio et al. | 709/224 |
| 2002/0161673 A1 * | 10/2002 | Lee et al. | 705/27 |
| 2003/0005350 A1 | 1/2003 | Koning et al. | |
| 2003/0163300 A1 * | 8/2003 | Kasvand et al. | 704/2 |
| 2004/0068552 A1 | 4/2004 | Kotz et al. | |
| 2004/0136698 A1 | 7/2004 | Mock | |
| 2004/0138953 A1 | 7/2004 | Van Luchene et al. | |

(Continued)

FOREIGN PATENT DOCUMENTS

WO    WO03067469    *   8/2003

OTHER PUBLICATIONS

Clark, James "XSL Transformations (XSLT)" http://www.w3.org/TR/xslt Nov. 16, 1999.*

(Continued)

*Primary Examiner* — Son T Hoang
(74) *Attorney, Agent, or Firm* — Fenwick & West LLP

(57) ABSTRACT

A system (and a method) automatically generates a feed from structured or unstructured data. The system identifies a resource having two or more data elements. The resource is matched with a pre-defined template. The pre-defined template is structured for a feed and includes a plurality of fields. The system extracts data elements from the two or more data elements of the resources. Each extracted data element corresponds to a field or the plurality of fields in the pre-defined template. Each extracted data element is then merged into the corresponding field or the plurality of fields in the pre-defined template to generate the feed.

36 Claims, 30 Drawing Sheets

(56) References Cited

U.S. PATENT DOCUMENTS

| | | | |
|---|---|---|---|
| 2004/0181598 A1 | 9/2004 | Paya et al. | |
| 2004/0181753 A1* | 9/2004 | Michaelides | 715/523 |
| 2004/0205467 A1* | 10/2004 | Kofman et al. | 715/500 |
| 2004/0225749 A1* | 11/2004 | Pavlik et al. | 709/245 |
| 2004/0254939 A1* | 12/2004 | Dettinger et al. | 707/100 |
| 2005/0004995 A1 | 1/2005 | Stochosky | |
| 2005/0027741 A1* | 2/2005 | Eichstaedt et al. | 707/104.1 |
| 2005/0165615 A1* | 7/2005 | Minar | 705/1 |
| 2005/0240608 A1 | 10/2005 | Jones et al. | |
| 2005/0243862 A1 | 11/2005 | Krishnan | |
| 2006/0069618 A1 | 3/2006 | Milener et al. | |
| 2006/0167749 A1 | 7/2006 | Pitkow et al. | |
| 2006/0168622 A1* | 7/2006 | Poll et al. | 725/46 |
| 2006/0173985 A1 | 8/2006 | Moore | |
| 2006/0230021 A1 | 10/2006 | Diab et al. | |
| 2007/0124432 A1 | 5/2007 | Holtzman et al. | |
| 2008/0027830 A1 | 1/2008 | Johnson et al. | |
| 2008/0275984 A1 | 11/2008 | Ullmann et al. | |
| 2009/0037388 A1 | 2/2009 | Cooper et al. | |
| 2010/0217821 A1 | 8/2010 | Grayson et al. | |
| 2011/0264508 A1 | 10/2011 | Harik et al. | |
| 2012/0054216 A1 | 3/2012 | Haahr et al. | |

OTHER PUBLICATIONS

Bray, Tim et al. "Extensible Markup Language (XML) 1.0" http://www.w3.org/TR/1998/REC-xml-19980210 Feb. 10, 1998.*

Miller, Libby "RSS, xhtml and XSLT" http://www.w3.org/2001/sw/Europe/200207/rascal/xsIt-rss-events.html Jul. 4, 2002.*

"Command-Line Utility" http://web.archive.org/web/20010207201608/http://xml.apache.org/xalan-j/commandline.html Feb. 7, 2001.*

Beal, B., "Are RSS Feeds the Next Great Marketing Tool?" CRM News, SearchCRM.com, Oct. 19, 2004, 5 pages, [online] Retrieved from the Internet <URL:http://searchcrm.techtarget.com/originalContent/0,289142,sid11_gci1017317,00.html>.

PCT International Search Report and Written Opinion, PCT/US05/17194, Oct. 18, 2006, 6 pages.

Pilgrim, M., "What is RSS," XML.com, Dec. 18, 2002, 9 pages, O'Reilly Media, Inc., [online] Retrieved from the Internet <URL:http://xml.com/lpt/a/1080>.

Woodman, M., "Putting RSS to Work: Immediate Action Feeds," XML.com, Dec. 14, 2005, 6 pages, O'Reilly Media, Inc., [online] Retrieved from the Internet <URL:http://www.xml.com/lpt/a/1635>.

Frenchman, E., "RSS: What's in it for Marketers? (Part 2)," MarketingProfs.com, May 23, 2006, 1 page.

Heck, M., "SimpleFeed Turns RSS into Client Relationship Tool," InfoWorld, Feb. 17, 2006, 2 pages.

Malykhina, E., "Turn RSS Into Really Simple Sales," InformationWeek, Apr. 3, 2006, 1 page.

Needleman, R., "RSS: Beyond the Blog," Fresh Produce, Release 1.0, Jan. 11, 2005, 3 pages.

Ulanoff, L., "'Goodbye' RSS," PCMag.com, Nov. 30, 2005, 1 page.

Utter, D. A., "SimpleFeed Secures RSS Feed Publishing," webpronews.com, Feb. 7, 2006, 1 page.

Miller, E. et al., "W3C RSS 1.0 News Feed Creation How-To," Jan. 24, 2001, [online] Retrieved from the Internet <URL:http://www.w3.org/2001/10/glance/doc/howto>.

"RDF Site Summary (RSS) 1.0," Dec. 6, 2000, [online] Retrieved from the Internet <URL:http://web.resource.org/rss/1.0/>.

"RSS :: Creating Feeds," Bitwise Magazine, Aug. 2005, Dark Neon Ltd., [online] Retrieved from the Internet <URL:http://www.bitwisemag.com/copy/reviews/software/internet/rss/feedge . . . >.

Grossnickle, J. et al., "RSS—Crossing into the Mainstream", Yahoo! Inc., White Paper, Oct. 2005, 12 pages.

United States Office Action, U.S. Appl. No. 11/129,634, Apr. 9, 2010, 24 pages.

United States Office Action, U.S. Appl. No. 11/129,634, Nov. 10, 2009, 22 pages.

United States Office Action, U.S. Appl. No. 11/129,634, Sep. 27, 2010, 24 pages.

United States Office Action, U.S. Appl. No. 11/129,634, Apr. 10, 2009, 23 pages.

United States Office Action, U.S. Appl. No. 13/301,275, Oct. 24, 2012, 37 pages.

United States Office Action, U.S. Appl. No. 13/301,275, Jun. 1, 2012, 21 pages.

* cited by examiner

100

```
<hDOCTYPE HTML PUBLIC "-//W3C//DTD HTML 4.01 Transitional//EN"
"http://www.w3.org/TR/html4/loose.dtd">
<link.net="alternate" type="application/rss+xmt" title="RSS"
href="customername.simplefeed.com.index.rdf" />
<html lang="en.us">
<head>
    <title>EAG United States - Welcome</title>
    <meta http-equiv="Content-type" content="text/html; charset=ISO-8859-1">
    <meta http-equiv="Content-Style-Type" content="text/css">
    <meta name="eag design version" content="eagweb.1.2">
    <meta name="target country" contetnt="us">
    <meta name="web section id" content="R163">
    <meta name="page content" content="all">
    <meta name="segment" content="any">
    <meta name="user type" content="any">
    <!-- <meta name="product service name" content="ENTER_PRODUCT_SPECIFICATION">
    <meta name="lifecycle" content="ENTER LIFECYCLE"> -->
    <meta name="generator" content="Globalsight (4.x)">
    <meta name="keywords" content="EAG, Enterprise, Automation, Group,
presario, evo, prosignia, deskpro, armada, ipag">
    <meta name="Description" content="Making technology work.">
<script type="text/javascript" language="JavaScript">
<!--
    document.write('<style type="text/css">.color33333bg
{background-color:#333333;}</style>');
//-->
</script>
<!-- delete random JS for static page -->

<script type="text/javascript" language="JavaScript">
    var CORP = 0;
    var HHO = 1;
    var SMB = 2;
    var ENT = 3;
    var seg_choices = new Array(CORP, HHO, SMB, ENT);
    //var cycle = seg_choices[Math.floor(Math.random() * seg_choices.length)];
    var cycle=3;
    var src_bl = new Array();
```

FIG. 8a e EAG. Inc. SharpReader

File Tools Help

🗘Refresh | http://eagsampleeed.net/1BBQRRRABSZ01

☐ Subscribed Feeds (172/1984)
   ☐ EAG Inc. (5/10)
   ☐ New York Imnes Technology (5.5)
   ☐ WS.I.com: What's News Technology
   ☐ Gartner Group (0/0)
   ☐ Jupiter Michael Gartenberg (6.55)
   ☐ IOC Research (3/7)
   ☐ CBS MarketWatch.com-Software
   ☐ Forbea.com Technology News (5/1)
   ☐ Sleebdot (13/167)
   ☐ Wired (4/10)
   ☐ Red Herring (4/71)
   ☐ SAP Ventures (7/66)
   ☐ BurnhansBest (0/9)
   ☐ Knowledge@Wharton (0/30)
   ☐ BeyondVC (0/10)
   ☐ A VC (15/69)
   ☐ Flatron - Colonna (3/28)
   ☐ VentureBlog (0/19)
   ☐ MSDR Just Published (13/201)
   ☐ IT Conversations (with enclouver)
   ☐ CIO.com-Web Serveices (0/0)
   ☐ Cliet News.com (10/145)
   ☐ AlwaysOn Network (15/154)
   ☐ Blog Maverich (2/13)
   ☐ Scobietzer: Microsoft off Geek Blogge
   ☐ Alan Meckter (1/22)
   ☐ John Batteile's Searchblog (11/76)
   ☐ Stove Gilmor's Blogosphere (0/21)
   ☐ Tim Bray (1/66)
   ☐ Werblog (0/9)
   ☐ Feld Thoughts (3/53)
   ☐ Orn Malik's Broadband Blog (12/14)
   ☐ eWeek.com - Steve Gillmor's Coll
   ☐ The EAG, Inc. (1/19)
   ☐ Lessig Blog (3/72)

Title
⊞ ✉ Breakthrough EAG Technology up
   ✉ EAG Announces Webland to Trail
⊞ ✉ The Body Shop Chooses EAG to A
⊞ ✉ EAG Expands Relationship with Pr
⊞ ✉ EAG Survey Shows Business Pros
⊞ ✉ EAG Introduces Point of safe Migra
⊞ ✉ EAG Safe Goal to Recycle 1 Billion
⊞ ✉ Retail World 2004
   ✉ Please Personalize Your Content
⊞ ✉ Office Depot and EAG to Other Ind recycling expertise and Office Dep
the most comprehensive, convenie
available.

Office Depot and EAG will collect
entertainment products from any n
printers, scanners, handhelds, dig
monitors, TVs (27" or smaller), TV/
Depot stores will be recycled at E/
Tenn.

About EAG

EAG is a technology slolutions pro
company's offerings span IT infras
and imaging and printing. For the
$76.8 billion. More information abo
http://www.EAG.com

Was this content Useful?

| Not At All | O | O | O |

FIG. 8c

| List Feeds | Build New Feed | Edit Customizer | Alerts and Updates | Reports and Analytics | |
|---|---|---|---|---|---|
| AT&T GSM | | | 04/04/2004 4:05am | | Edit |
| AT&T TDMA | | | 04/04/2004 4:05am | | Edit |
| Cingulas GSM | | | 04/04/2004 4:05am | | Edit |
| T-Mobile GSM | | | 04/04/2004 4:05am | | Edit |
| Sprint PCS | | | 04/04/2004 4:05am | | Edit |
| Verizon | | | 04/04/2004 4:05am | | Edit |
| All Accessories | | | 04/04/2004 4:05am | | Edit |
| Batteries | | | 04/04/2004 4:05am | | Edit |
| HandsFree | | | 04/04/2004 4:05am | | Edit |
| Docking Cradles | | | 04/04/2004 4:05am | | Edit |
| Software - All | | | 04/04/2004 4:05am | | Edit |
| Software - Games | | | 04/04/2004 4:05am | | Edit |
| Software - Productivity | | | 04/04/2004 4:05am | | Edit |
| Software - Synchronizing | | | 04/04/2004 4:05am | | Edit |
| Software - Updates | | | 04/04/2004 4:05am | | Edit |
| SUX 1000 | | | 04/04/2004 4:05am | | Edit |
| SUX 2000 | | | 04/04/2004 4:05am | | Edit |
| SUX 3000 | | | 04/04/2004 4:05am | | Edit |
| SUX 4000 | | | 04/04/2004 4:05am | | Edit |
| SUX 5000 | | | 04/04/2004 4:05am | | Edit |
| SUX 6000 | | | 04/04/2004 4:05am | | Edit |
| Camera Phones | | | 04/04/2004 4:05am | | Edit |
| BlueTooth Phones | | | 04/04/2004 4:05am | | Edit |
| WiFi Phones | | | 04/04/2004 4:05am | | Edit |
| On Sale! | | | 04/04/2004 4:05am | | Edit |

Simple Feed — search: [  ] GO

FIG. 11

Simple Feed

List Feeds | Build New Feed | Edit Customizer | Alerts and Updates | Reports and Analytics search: [    ] GO Feed Name: [    ]   ☑ Add to Customization Page Data Source: [//vignette.staging.rss.ocpmobile.com/o3iosh.xml ▼] [Browse]

Member of:
```
AT&T GSM
AT&T TDMA
Cingular GSM
T-Mobile GSM
Sprint PCS
```
Select Nons   CTRL-click for multiple Publish to Server: [//pluto.rss.ocpmobile.com/sux6000.xml ▼] [Browse]

Poll for New Content: Every [5 ▼] minutes

[Preview Feed] [Submit Feed]

FIG. 12a

Edit Article

Edit Article

| | |
|---|---|
| TITLE: | EAG Sets Goal to Recycle 1 Billion Pounds |
| AUTHOR: | EAG,Inc |
| URL: | http://www.eag.com/pr.71404 |
| DAYS PUBLISHED | 1 |
| INSERTION DATE: | 11/07/2004 21:01 |
| DESCRIPTION: | EAG today announced it is accelerating its product recycling program by setting a goal to recycle 1 billion pounds of electronic products and printing supplies globally by 2007. |
| CONTENT: | C:\Documents and Settings\Desktop\EAG R  [Browse] |
| SIMPLETAGS: | ☑ Components<br>☐ Construction<br>☐ Developers<br>☐ ESX Software<br>☑ Education<br>☐ Energy<br>☐ Events<br>☐ Financial Services |

Look and Feel: OCP Mobile ▼

| Feed Name: | Add? ☐ | Data Source: //vignette.staging.rss.ocpmobile.com/o3iosh.xml ▼ | Browse |

(repeated 11 times)

Preview Feed    Add To Page

◎ Simple Feed

| List Feeds | Build New Feed | Edit Customizer | Alerts and Updates | Reports and Analytics | search: [      ] GO

Feed: [ SUX 6000 ]

Starting Date: [ April 1, 2004 ▸ ]

Ending Date: [ September 30, 2004 ▸ ]

Standard Reports: [ Revenue from Feed ▸ ] [ Generate ]

Bottom of From

Export Data As: [ Excel Spreadsheet (.XLS) ▸ ] [ Generate ]

Custom Reports : Define

Simple Feed   All Rights Reserved

FIG. 14

OCPMobile be alive     be mobile home     mobile phones     service plans

OCP Mobile in the news

> OCP Mobile announces partnership with Media Alliance LLP, in order to further the advance of mobile phone service contracts across the Midw....
read more>>

> Lorem Ipsum Autem opto importunus secundum haero premo deinnum, olim premo qui. Humo abdo luptatum, et luptatum validus in, uxor consequat
read more>>

> Autem opto importunus secundum haero premo darnnum, olim premo qui Humo ebdo luptatum, et luptatum validus in, uxor consequat facilisis pau
read more>>

Customer Center user name or mobile number:

password:     Log in

NEW! SUX6000 learn more>>

Home | Mobile Phones | Service

OCPMobile be alive | be mobile home | mobile phones | service plans | advertising

NEW!
SUX6000

Coming Soon!
Be the first on your block with the most feature-rich mobile phone that you can buy without a license to kill

SUX6000 in the news
> OCP Mobile is set to announce their newest phone, the SUX 6000 next week at MOBILECON in Las Vegas Industry experts are already calling it the next generation or mobile technology, leaving other read more>>
> Keep on top of the latest product announcements with our custom RSS feed generator!
  [XML]

Custom RSS Feed Generator

> Subscribe to the latest ne By creating a custom RS software updates, custom provide. why keep having directly to you?

I am interested in finding

☐ AT&T GSM
☐ T-Mobile GSM
☐ All Accessories
☐ Docking Cradles
☐ Software - Productivity
☑ New Phones
☐ SUX 225000
☐ SUX 5000
☑ BlueTooth Phones

FIG. 18

My Yahoo!  Hello Joshua  Yahoo! . Help  powered by hp
[Sign Out, Account Info]

Easter Roses $29.99 FREE VASE
EASTER IS SUNDAY APRIL, 11TH!   Proflowers

Search the Web: [     ] Search  Advanced (move to bottom)

My Front Page                                            friday - apr2

[ Change Colors ] [ Choose Content ] [ Change Layout ] [ Add/Delete Pager ]   [ make this my homepage ] [ hide buttons ]

Happy Easter! 10% Off FTD Flowers, AVON 10% off $60 order, Easter flowers!

Financial [Edit] [x]
Accounts
RSS Headlines (BETA) Feedback?

You must use secure MY 🔒
Yahoo! to view your account
details.

OCP Mobile Headlines
- SUX 6000 Coming Soon for AT&T Wireless Customers! 1 hour ago
- Zagats to Go now available on All OCP Mobile. 12 hours ago
- 200 Free Prints from Kodak with purchase of OCP Camera Phone  20 hours ago

Message Center [Edit] [x]                                                              [Edit] [x]
Check Calendar 👆

Slashdot: Games                                                                          [x]
- Sony Hints on PS3, PSP, and PS2 Plans - 1 hour ago
- Nintendo To Get DS Renamed, Paper Mario Sequel - 6 hours ago
- Mogi Location-Based Mobile Gaming Hits Japan - 10 hours ago
- Metal Gear Solid Gets TTS Speed Demo, Sequel Features  - 14 hours ago
- Mamage Proposal via Atari 2600?  - 18 hours ago

Portfolios [🔄][Edit][x]
▽ Josh 2001                    Edit

CNN Top Stories                                                                           [x]
- NOK    21.03   +0.33
- AAPL   27.57   +0.46
- PCLE    9.45   +0.32
- GENE    5.48   +0.13
- PG    106.00   +0.02
- HD     36.69   −0.39
- AMZN   46.02   +1.28
- AOL    15.69    0.00

- Mistrial in Tyco case  - 29 minutes ago
- U.S. companies add 308,000 jobs - 29 minutes ago
- Police: Student changes abduction story - 29 minutes ago
- Two U.S. troops killed in separate Iraqi attacks - 2 minutes ago

FIG. 20

DATA EXTRACTION FOR FEED GENERATION

CROSS REFERENCE TO RELATED APPLICATIONS

This application is a continuation-in-part of and claims a benefit of U.S. patent application Ser. No. 11/129,634, filed on May 13, 2005 now U.S. Pat. No. 8,065,383 and titled "Customizable and Measurable Information Feeds for Personalized Communication", which claims a benefit of and priority under 35 USC §119(e) to U.S. Provisional Patent Application No. 60/572,174, filed May 17, 2004, and titled "System and Method for Providing Customizable and Measurable Information Feeds to Constituents," and U.S. Provisional Patent Application No. 60/615,005, filed Sep. 30, 2004, and titled "System and Method for Providing Personalized XML Syndication Feeds in Conjunction with Auto-Discovery and Continuously Updating the Personalized XML Syndication Feeds for Each Subscriber," the contents of each which is herein incorporated by reference.

BACKGROUND

1. Field of the Art

This invention relates generally to information extraction and distribution and more particularly to the extraction and distribution of customizable and measurable information feeds to users.

2. Description of the Related Arts

Many entities spend millions of dollars in communicating with their constituencies. These constituencies may represent current, past and potential customers, employees, shareholders, and business partners. However, it is a challenging task to effectively communicate with such constituencies. For example, it is difficult for a business to deliver the right marketing message to the right customer at the right time.

Typically, entities use telephone, face-to-face meetings, advertising, web sites, and e-mails to communicate with their constituencies. However, each of these methods has limitations. Telephone calls and face-to-face meetings are unable to reach a broad number of constituencies in a finite amount of time. Advertising may be poorly targeted and cost ineffective. Web sites may have difficulty getting repeat visitors. E-mails are facing limitations due to viruses, spam, customer resentment and apathy, and the lack of personalization. In addition, recent legislations such as the Controlling the Assault of Non-Solicited Pornography and Marketing Act of 2003 impose significant restrictions on entities in their use of e-mail correspondence.

Some entities try to overcome these limitations by using information syndication technologies such as rich site summary or really (or real) simple syndication ("RSS") and Atom, both of which are generally referred to as feeds. Feeds consist of information in a file with extensible markup language ("XML") tags and saving the file in a server such as a web server. Users can use client-side agents such as aggregators, portals, or browsers to monitor these files, understand changes to information (e.g., via the XML metadata), and download updates if appropriate. Feeds have many advantages over traditional communication methods, including cost effectiveness, potential higher user opt-ins (e.g., since an e-mail address is not necessary to subscribe to a feed), compliance with related laws and regulations, and presently, a lack of viruses and spam.

Nevertheless, feeds have many limitations, including the difficulty for non-technical people to create a feed, the lack of personalization, and the lack of a way to measure the effectiveness of feed communications. For example, early adopters of feed publishing have hundreds of feeds on their web sites. Thus, users are forced to guess and select which feeds are desirable to them. In addition, it is difficult for an entity to understand which feeds, if any, are effective in meeting its communication objectives, since there is not an available method to measure and analyze the effectiveness of feed communications. Furthermore, designing an effective feed is difficult since entities are communicating with a client-side agent to gain a user's attention. Such a client-side agent may become increasingly sophisticated and vital to an entity's objectives.

To address the problems of end-user usability, an auto-discovery technique was developed for a client-side agent to automatically discover the availability of feeds on a particular network location. In this auto-discovery technique, a user's client-side agent searches pages on a web site to look for a hypertext markup language ("HTML") tag that indicates support for feeds. The client-side agent then places a universal resource identifier ("URI") such as a uniform resource locator ("URL") of the feed into the client-side agent to allow the user to subscribe to the feed. However, even though auto-discovery provides the ease of discovering feeds, it still lacks the ability to create personalized feeds.

In addition, entities and their constituencies' information needs change over time. For example, a business's products and services may be introduced, sold, supported, and ultimately removed from the market place. A customer's interest in a business' products and services may change based on competitors' pricing. As a result, the business may no longer have information to send to a particular customer via a feed, and the customer may find the feed less relevant to his or her interest. One solution is to insert content into the feed suggesting the customer to subscribe to a new feed. But requiring the customer to unsubscribe, visit a web site, and re-subscribe to a new feed is a hassle for the customer, which may eventually decrease feed subscriptions.

In addition, as feeds are delivered by means of a URL, such URLs can be discovered by software agents and/or shared with other users via a variety of methods such as Outline Processor Markup Language (OPML), search engine and directories. This presents problems for entities that wish to deliver personalized information via feeds and/or wish to measure feed use on a per subscriber basis. It also presents problems for subscribers who may get irrelevant content and/or who may intentionally or unintentionally customize another subscriber's feed.

Further, feeds are taxing on systems that serve the particular feeds due to automatic user agents polling the server continuously (at a preset interval) for information updates. This may cause either severe spikes in load for the servers or cause bandwidth spikes that would exceed thresholds and thus result in excessive charges. This problem may get worse as more real time data is placed in RSS Feeds and user agents increase the frequency of their requests. In addition, if systems are unavailable due to maintenance or failure, user agents typically return error messages, an unsatisfactory experience for users.

Still another problem is the labor intensiveness necessary to maintain a feed. This is often compounded by repetitive efforts of maintaining a web site along with separately maintaining a feed. Hence, duplicative efforts are necessary to keep multiple sources updated.

In addition, options for formatting feeds are limited to manual tools. There are limitations associated with formatting feeds, which include issues involving control of publishing processes, getting subscribers relevant content, content appearance, and measurability relative to supplied feeds. Thus, there remains a difficulty in extracting information for a feed as well as formatting that information into a feed.

Therefore, in view of these shortcomings in the art, there is a need for (1) a technique that allows feed personalization in an auto-discovery environment, (2) feeds that provide continuous monitoring of feed use to enhance feed relevancy and personalization, (3) securing, authenticating and identifying feed publishers, feeds and feed subscribers, as well as (4) distributing the load and handling availability while maintaining an entities desired quality of service as well as (5) an automated method for capturing updates from a resource, and extracting relevant data into a feed with appropriate formatting.

SUMMARY

To address the above, the present invention includes a system and a method for providing a personalized feed to a user. In an embodiment of the invention, information regarding the user is obtained from a source. For example, a user profile module may obtain the information regarding the user via customization content provided to the user. The customization content indicates various categories of content from which a user may make a selection. In response to the user selecting his or her categories of interest, a feed personalization module selects content pieces whose associated categories match the user selected categories. The feed personalization module then provides a personalized feed including these content pieces to the user.

In another embodiment of the invention, the system and method of the present invention assigns a unique identifier to the user and provides the personalized feed to the user via the unique identifier. The unique identifier can be any unique identifier, for example a unique URL, a cookie, a digital certificate, an IP address, a machine fingerprint, or a username and/or password. Using the unique identifier, the present invention is able to track the user's actions with respect to the provided feed. Thus, an embodiment of the invention further re-personalizes the feed according to the user's actions. Another embodiment of the invention requests an input from the user regarding the relevance of the feed to the user's interests. Based on the input from the user, the feed may further be re-personalized to provide relevant content to the user.

In addition, one embodiment of the present invention includes maintaining a database of content formats, for example, templates that have predefined rules for presenting information of a finished, content item, e.g., a feed. A mechanism captures updates from a resource, e.g., structured or unstructured content such as a web page, email, rich site summary or really (or real) simple syndication ("RSS") feed, a video or audio stream or fragment, a graphic, or text, and matches a template from the database with the contents of the resource. Once an appropriate template is identified, a resource analyzer extracts relevant data from the resource to populate the template and generate the feed. Thus, relevant feeds can be quickly assembled for distribution from a large body of available resources without the need for time intensive data entry and customization necessary for each resource.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 8a illustrates one embodiment of an exemplary HTML document with the appropriate HTML tag that indicates the support of auto-discovery in accordance with the present invention.

FIG. 11 illustrates one embodiment of the screenshot of an exemplary web page that allows a publisher to view existing feeds, create new feeds, review alerts and updates, and generate reports for analysis in accordance with the present invention.

FIGS. 12a and 12b illustrate one embodiment of the screenshot of an exemplary web page that allows a publisher to create, categorize, and publish a feed in accordance with the present invention.

FIG. 13 illustrates one embodiment of the screenshot of an exemplary web page that allows a publisher to specify the data source of a feed and to customize the feed's format in accordance with the present invention.

FIG. 14 illustrates one embodiment of the screenshot of an exemplary web page that allows a publisher to generate a report on feed use in accordance with the present invention.

FIG. 20 illustrates one embodiment of the screenshot of an exemplary third-party web page to which personalized feed content has been added in accordance with the invention.

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

The present invention includes a system and a method for providing a personalized feed to a user. Feeds are created by putting information into a file with extensible markup language ("XML") tags and dynamically generating or saving the file in a server such as a web server. Users can use client-side agents such as aggregators, portals, or browsers to monitor these files, understand changes to information (e.g., via the XML metadata), and download updates if appropriate. In one embodiment, customization content is provided to the user for the user to define categories of content that are of interest to the user. Alternatively, the user can define other parameters, for example, keywords, limits, ranges, or the like. In addition, a unique identifier is provided to the user for directing the user's client-side agent (e.g., an aggregator, browser, or portal) to feeds personalized based on the defined categories. The unique identifier also allows a feed publisher to track the effectiveness of the feeds provided to the user.

Additionally, the system collects user inputs with regard to the provided feeds. The system is adapted to continuously re-personalize feeds based on the collected user inputs in order to provide relevant and desirable content to the user. The personalized feeds may be used for product marketing, sales, customer support, training, recruiting, investor relations, business partner relations, product development, internal corporate communications, etc.

One skilled in the art will readily recognize from the following description that alternative embodiments of the structures and methods illustrated herein may be employed without departing from the principles of the invention described herein.

Figure 1:
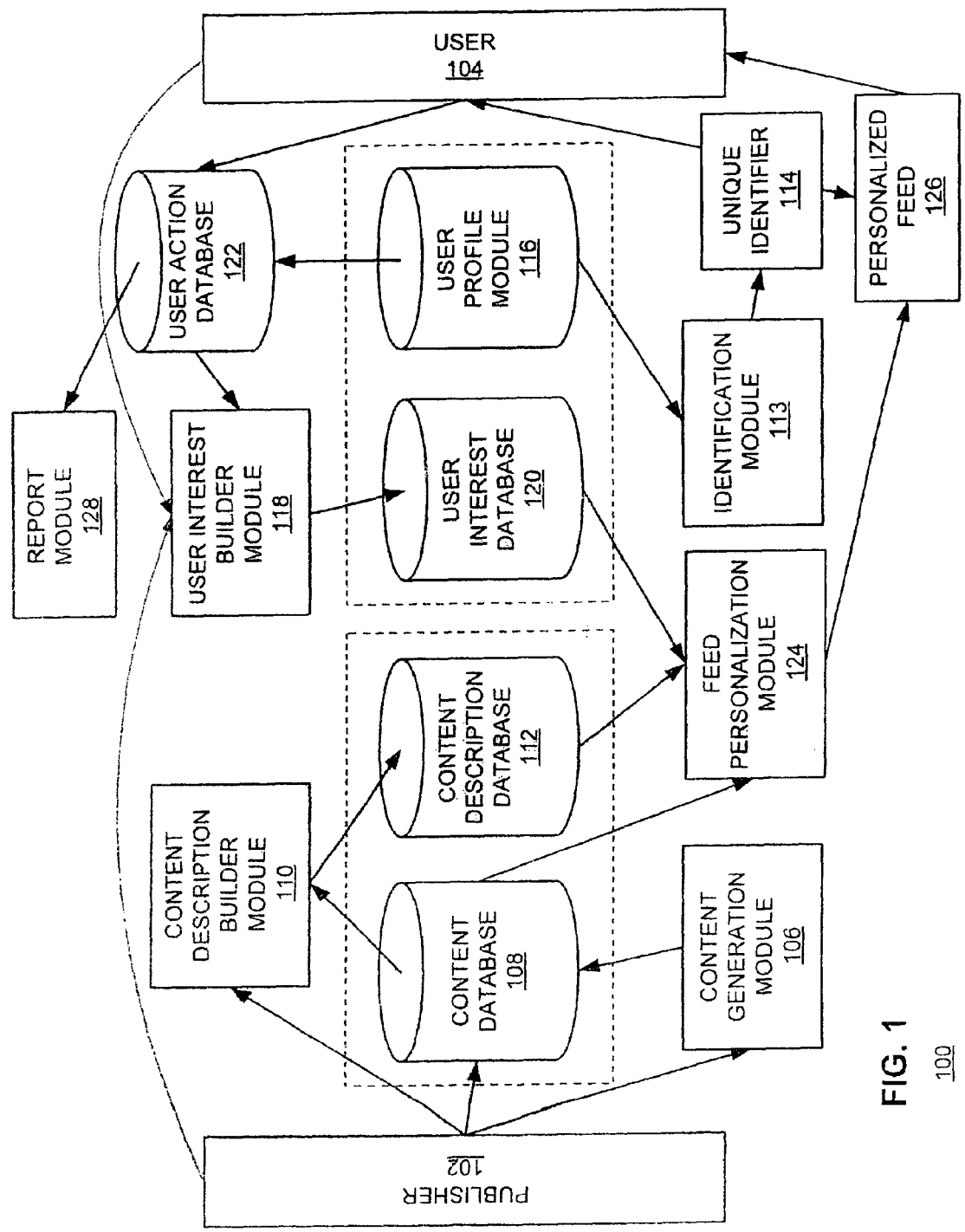
FIG. 1 illustrates one embodiment of a system for providing a personalized feed to a user in accordance with the present invention.

FIG. 1 illustrates a system 100 for providing personalized feeds to a user in accordance with an embodiment of the present invention. The system 100 is a server-based application with which entities and their constituencies interact via an agent such as a web browser or another server or other software. The system 100 can be located at any location in a network, for example, in an entity's premise, offsite on a global communications network such as the Internet, or a distributed environment (e.g., part within an entity's premise and part on the Internet).

A publisher 102 (e.g., an entity's employee) creates feeds using the system 100. The publisher 102 can log on to the system 100 following authenticating himself or herself, for example, using a user identifier and/or password. In response to successfully authenticating the publisher 102, the system 100 generates a user interface such a web page for the publisher 102 to create new feeds, view and edit existing feeds, review alerts and updates concerning the system 100, and perform reporting and analysis on the effectiveness of feed communications. Alternatively all this functionality can be accessed via optionally secured and/or protected application programming interface (API).

The system 100 allows a non-technical publisher to create, categorize, and publish feeds. According to an embodiment of the invention, to create personalized feeds, the publisher 102 first creates new content. For example, the publisher 102 can use the user interface provided by the system 100 to navigate a network (e.g., the Internet or intranet) to find the location of the data file or files to be provided to a user 104 as a feed. The user 104 may be a human or a machine such as a business process, a software agent, a search engine, etc. If the data files do not include the XML tags necessary for creating a feed, a content generation module 106 is adapted to convert the files into a readable feed by adding the necessary XML tags.

The publisher 102 can also create text or other content (e.g., copying from a content creation software program) in a browser-based text box of the user interface, via API, and/or upload discrete data files and attachments or enclosures for the content generation module 106 to create the necessary XML tagged data file. The content generation module 106 further allows the publisher 102 to name a feed and decide if the feed content can be personalized. The publisher 102 can use the user interface to find and decide on a network location to publish the feed and to specify how often to check for changes to the feed content.

The user interface and/or API further allows the publisher 102 to preview the feed and examine the XML tagged file before deciding to publish the feed. If the publisher 102 decides to publish the feed, a content database 108 is adapted to store the XML tagged data file (including its content and the related information such as the location where the feed is published) created by the publisher 102 manually or via the content generation module 106.

The system 100 further allows the publisher 102 to create relations between a given piece of content and one or more categories to assign the categories to the piece of content for personalization purposes. In an embodiment of the invention, a content description builder module 110 builds the content description for each piece of content. The content description is then stored in a content description database 112. The content description builder module 110 can build the content description for a piece of content by receiving inputs from the publisher 102 directly, by analyzing the content piece automatically, or by some other methods. For example, the publisher 102 may define a set of categories that various contents may be related to.

The content description thus comprises a list of categories that apply to the particular piece of content. Hence, the content description builder module 110 can build the content description for a content piece by receiving a complete list of categories from the publisher 102 and receiving inputs from the publisher 102 specifying the categories that are applicable to the particular content piece. Alternatively, the content description builder module 110 can build the content description by performing textual analysis on the content piece to derive the applicable categories for the content piece.

Figure 2:
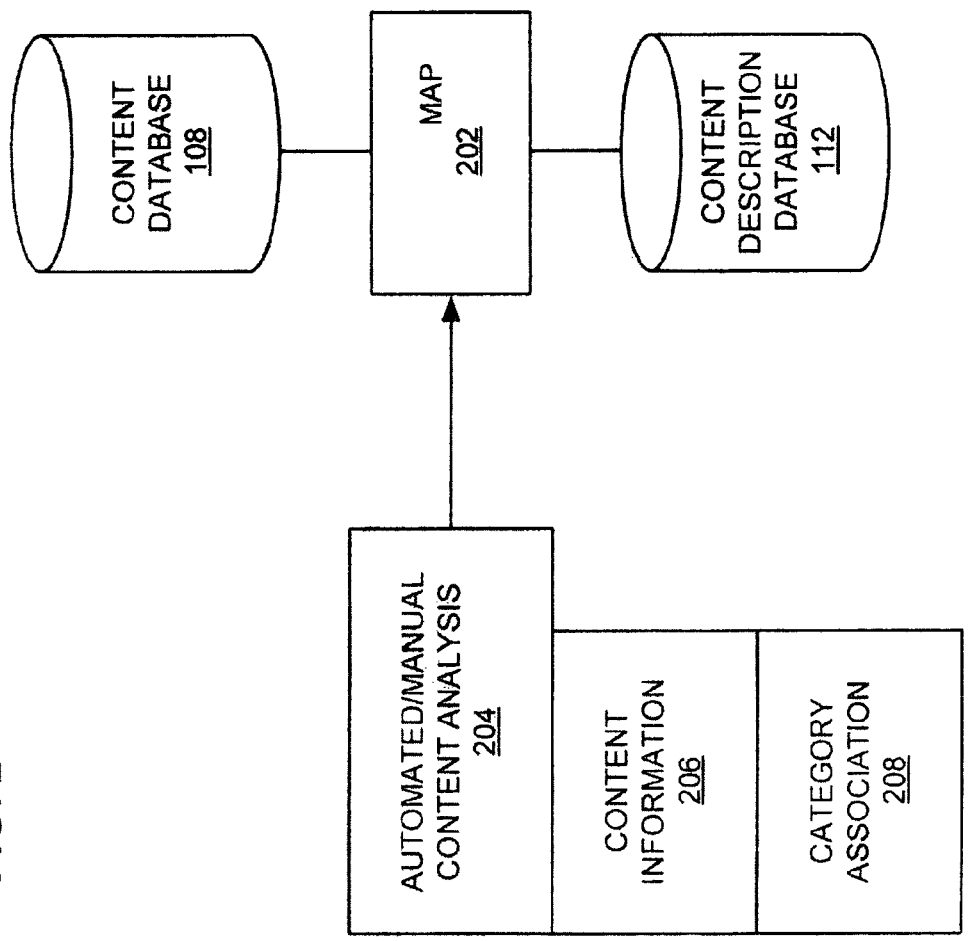
FIG. 2 illustrates one embodiment of an architecture for mapping content descriptions to content pieces in accordance with the present invention.

FIG. 2 illustrates an architecture for mapping content descriptions stored in the content description database 112 to pieces of contents stored in the content database 108, according to an embodiment of the invention. As shown in FIG. 2, the content description builder module 110 is adapted to build a static map 202 to associate each content piece stored in the content database 108 to one or more content descriptions (e.g., categories) stored in the content description database 112. In particular, the content description builder module 110 analyzes 204 each content piece stored in the content database 108 either manually (e.g., by receiving inputs from the publisher 102) or automatically (e.g., by using textual analysis). The static map can be rebuilt at predefined times and/or based on internal or external event triggers.

Mapping content descriptions stored in the content description database 112 to pieces of contents stored in the content database 108 can also be done dynamically. Dynamic mapping can be affected by various factors including explicit user input, information provided by third party systems, information stored in system 100 (such as reporting/statistics, other content items), and runtime characteristics (both of the user agent and of the system 100). Dynamic mapping based on system reporting/usage (e.g. "most popular" category that gets mapped to the piece of content that was clicked the most number of times). In one embodiment, dynamic mapping can be based on relative scoring compared to other content (for example article length). In another embodiment, dynamic mapping can be based on external data. In another embodiment dynamic mapping could be based on temporal factors (for example, "last updated", "newest", "today"). In another embodiment, dynamic mapping can be based on aggregators' runtime characteristics (e.g. "most popular" for the region of the world where the client is located).

From the analysis, the content description builder module 110 generates content information 206 for each piece of content analyzed as well as a category association 208 for the analyzed content piece. The category association 208 specifies one or more categories associated with the given content information 206. The category association 208 and the content information 206 is then stored in a database as a map 202 between the content database 108 and the content description database 112.

Referring back to FIG. 1, after the user 104 creates a new user account on the system 100, an identification module 113 assigns the user 104 a unique identifier 114, which can be a mnemonic. According to an embodiment of the invention, the unique identifier 114 may be a unique URL, cookie (or other client side storage), Internet protocol ("IP") address, machine fingerprinting (e.g., a unique property or identifier of a piece of hardware or software such as a unique software installation), digital certificate, username and/or password or other tracking methods that uniquely identify the user 104. The mnemonic identifier may be based on any of the above tracking methods or assigned from other systems. The unique identifier 114, e.g., a mnemonic identifier, for the user 104 is stored in a user profile module 116 that obtains and stores profile information regarding the user 104.

Also shown in FIG. 1, a user interest builder module 118 is configured to continuously build and update interests of the user 104 by directly receiving inputs from the user 104, analyzing actions of the user 104, accessing the profile of the user 104 in other systems (e.g., the internal customer relationship management ("CRM") of the publisher 102), or some other methods. For example, user interests may comprise a list of categories (or other parameters, e.g., such as keywords or ranges) that the user 104 has explicitly or implicitly indicated to be of interest to him or her. Thus, the user interest builder module 118 may identify the user interests of the user 104 by asking the user 104 (e.g., in response to the user 104 creating an account with the system 100 or re-personalizing an existing feed) to select categories of interest out of the categories stored in the content description database 112. The user interests for the user 104 are stored in a user interest database 120.

The user interest builder module 118 can also build the user interest database 120 using the actions of the user 104. Actions of the user 104 are tracked (e.g., via the unique identifier 114 and server redirects) and stored in a user action database 122, which is linked from the record of the user 104 stored in the user profile module 116. The user actions may represent behaviors of the user 104 (e.g., based on past user activities relative to a document, a feed, a web site or the system 100, or any information regarding the user 104 such as purchase history). The user actions may also be derived from analysis of external data (e.g., obtained from third party web sites, agencies, or other entities) regarding the user 104 as well as statistical information with regard to the feed use of the user 104.

A feed personalization module 124 generates feeds out of the contents stored in the content database 108. In particular, the feed personalization module 124 is adapted to take the list of categories out of the user interests stored in the user interest database 120 and compare them to the categories stored in the content description database 112 to determine which pieces of contents are relevant to the user 104. By referring to the map 202, the feed personalization module 124 selects the content pieces whose assigned categories match the user interests for creating a personalized feed 126. The system 100 then inserts certain user identifiable information (e.g., a user name or company name) and tracking methods such as cookies and GIFs. The system replaces embedded URLs with re-direct URLs and provides the personalized feed 126 to the user 104 when requested by a client-side agent such as an aggregator, portal, or browser or by a software agent running on a server.

In one embodiment, the system 100 serves the personalized feed 126 to the user 104 via the unique identifier 114 to enable further user action tracking. The unique identifier 114 tracks future actions of the user 104. The user actions are stored in the user action database 122 for the user interest builder module 118 to continuously update the user interest database 120. Thus, the feed personalization module 124 can continuously provide relevant, personalized feeds to the user 104 based on various user actions.

Additionally the completed view served to the user 104 in the feed 126 may contain both readily identifiable and hidden watermarks identifying the particular user. Information stored in these watermarks may include, for example, a user's name, handle, or other identifier, feed identification, client software identification, client IP address or server name, time and date of content creation or feed generation, applicable copyright statements, applicable distribution restrictions, time interval during which this information can be accessed, as well as other DRM information. Readily identifiable watermarks can include adding the information to the content of the item, attaching it as meta or semantic tags, or embedding into elements (e.g., background image). Hidden watermarks can be embedded by using steganographic techniques, or by setting specific information if the document format supports it (e.g., rights management properties of PDF format).

A watermarking technique may be used in accordance with the present invention. After the content formatting module 408 constructs the feed content to be sent to the user 104, a watermarking module may optionally embed some or all of the information including information listed above including the feed's unique identifier 114, anything from user profile database 122 or client-side agent runtime properties 410. The resulting content items 224 are then assembled into a feed and served to the user 104.

Turning back to FIG. 1, the content of the personalized feed 126 may be in any number of views (e.g. complete or summary form), based on information regarding the user 104 that is stored in the user profile module 116, and/or run-time information (e.g., server and/or client), and/or based on the company's business rules. For example, if the user 104 is a subscriber to a particular publication, the feed personalization module 124 may provide the entire content of the publication's article in the feed 126 provided to the user 104. But if the user 104 is not a subscriber to the publication, the feed personalization module 124 may provide a summary description of the article in the feed 126 provided to the user 104.

To further personalize the feed, the system 100 can insert mnemonic identifiers in the feed URL and/or in various places in the Feed, such as the title and the content text. The mnemonic identifiers can come from subscriber input or unique identifiers or from company sources such as database records located in other systems. Such mnemonic identifiers have the benefit of insuring subscribers are using feeds which are personalized for them.

In an embodiment of the invention, the user 104 is able to specify the categories of interest directly to the user interest builder module 118 via customization content provided by the publisher 102 (e.g., a customization web page or a customization feed). In particular, the user interface (or optionally secured and/or protected API) provided by the system 100 allows the publisher 102 to select a method to be used by the user 104 to specify the categories of interest. Such a method may include checkboxes, keywords, categorization, navigating to an appropriate section of a web page to personalize information, etc. The publisher 102 can choose to publish the customization content in a variety of "look and feel" options. The publisher 102 can further preview and examine the customization content before providing it to the user 104.

The publisher 102 may examine the feed use to determine if the feed 126 has met its objectives. Via a report module 128, the publisher 102 can access a "report and analysis" user interface provided by the system 100. Within the "report and analysis" user interface, the publisher 102 can run a variety of preconfigured reports or download data in a variety of formats (e.g., XML, spreadsheet, word processor, comma separated values, etc.) to analyze the feed use. For example, to generate a preconfigured report, the publisher 102 can choose one or more feeds, a beginning and ending date range, and the type of report to be included (e.g., the number of subscribers, the growth in subscription, feed read rates, feed open rates, click through by the subscribers, revenue from the feed, relations to various cost parameters such as bandwidth and relative benchmarks of similar feeds, etc.). Alternatively, the reporting system may be accessed via optionally secured and or/protected API.

The user interface and/or API also allows the publisher 102 to generate and view graphical representations of the data. Feed use data is stored in a database of the system 100 (not shown) and derived from tracking users via unique identifiers such as URLs, embedded URL redirects, cookies, and integration with other corporate systems. The publisher 102 can analyze and generate reports on the feed use on a per user basis or as an aggregated group of users to determine if the feed communication has met its objectives.

Figure 3:
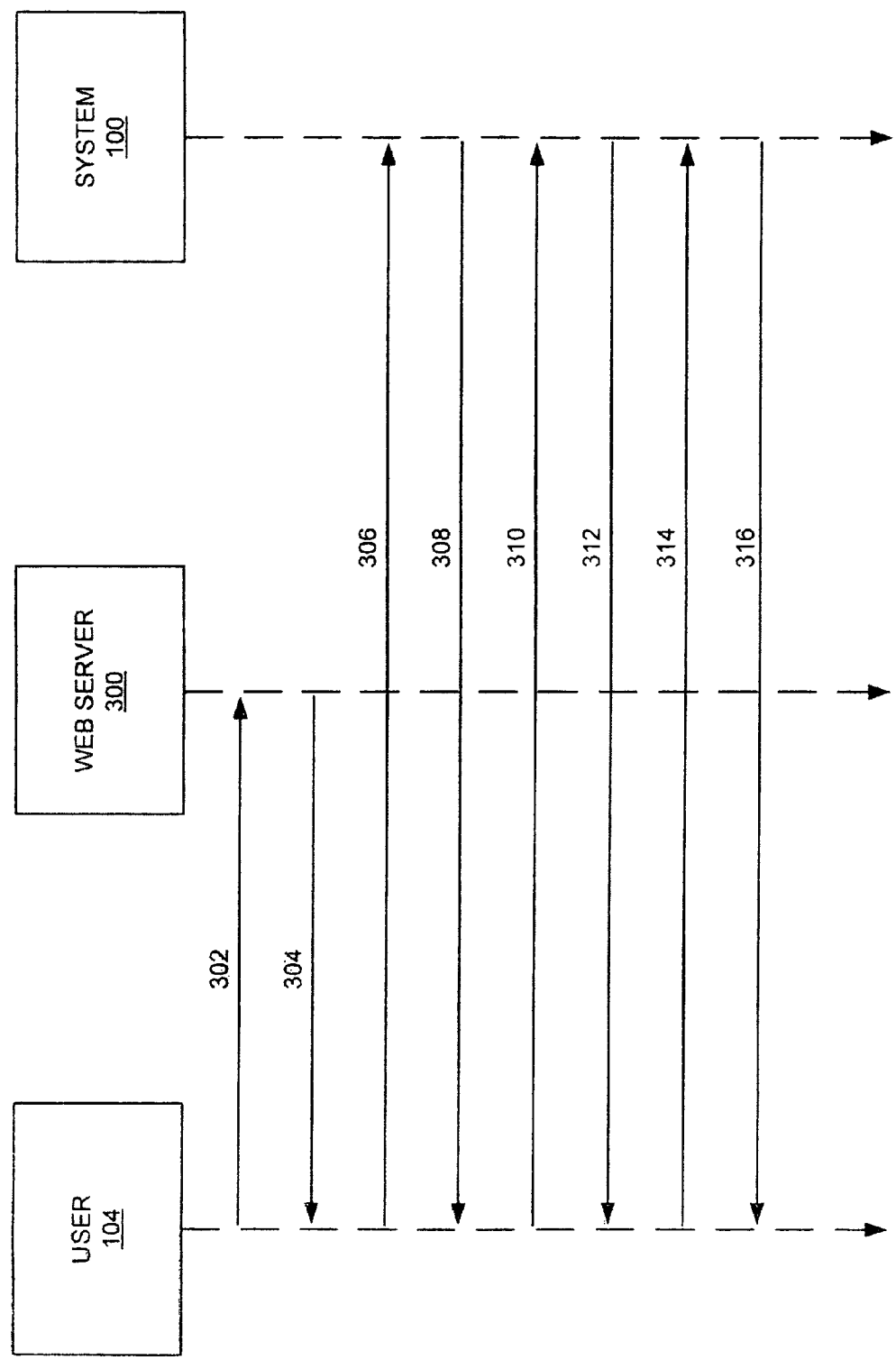
FIG. 3 illustrates one embodiment of a process for providing a personalized feed to a user in accordance with the present invention.

FIG. 3 illustrates a process for providing personalized feeds to a user according to an embodiment of the invention. The publisher 102 begins the process by inserting an appropriate HTML markup indicating the support for feed auto-discovery into a web page. When the user 104 performs 302 an auto-discovery of the web page, a web server 300 (which may reside on the same machine as the system 100) responds 304 to the user 104 with a feed URL.

The web server 300 may send to the user 104 a web page that includes a customization URL, which may be automatically inserted into the client-side agent of the user 104. In response to the user 104 requesting 306 the customization URL using the client-side agent, the system 100 sends 308 to the user 104 a customization feed that allows the user 104 to personalize future feed contents. The customization feed may include checkboxes, keywords, categorization, or navigation to allow the user 104 to select categories that are of interest to him or her. The customization feed may also include other contents than the customization content.

In an embodiment of the invention, instead of a customization feed, the system 100 provides a customization web page to the client-side agent. The customization web page includes customization contents that allow the user 104 to personalize feeds by choosing categories of interest. The system 100 may also respond with, or provide a location to get, the data type and description of the categories of interest. The client-side agent then either requests the categories of interest from the user 104 or automatically fills out the categories of interest based on data profiles of the user 104 stored in the client-side agent or information obtained from an external source.

In response to the user 104 requesting 306 the customization content, the system 100 may also obtain data regarding the user 104 (e.g., the IP address, aggregator type, browser type, etc.) from the client-side machine of the user 104. The system 100 is adapted to record the obtained data in the user profile module 116. The system 100 then dynamically builds customization content, translates the customization content into an appropriate format based on the information stored in the user profile module 116, and serves the appropriately formatted customization content to the user 104.

The user 104 accesses the customization content (e.g., via a customization feed or customization web page) using the client-side agent, personalizes future feeds by choosing categories of interest, and sends 310 the chosen categories back to the system 100. The system 100 then provides content (e.g., a web page, a file, etc.) including a unique identifier 114 (e.g., a unique URL) to the user 104 via the client-side agent. The user 104 can then use the unique identifier 114 to request personalized feeds. The system 100 then searches the user profile module 116 for a user record that matches the unique identifier 114.

An alternate embodiment performs auto-discovery in accordance with the present invention. When user 104 visits a web page, which contains auto-discovery URL, the user's client software receives response 304 containing the auto-discovery URL. The auto-discovery module creates an individual feed (URL) in a subsequent request 306 by client software to fetch this feed. Auto-discovery module further determines capabilities of the client software based on, for example, runtime characteristics of the client software, contents of the request 306 and any heuristic database of client capabilities potentially stored in the system 100 or available from some external resource.

If the auto-discovery module determines that client software is capable of automatically switching subscription URL, then a response is sent back instructing it to switch subscription URL to point to the individual URL. Such instruction can come in the form of, for example, a HTTP redirect, XML redirect, or any other protocol-specific mechanism. If the auto-discovery module determines the client software is not capable of switching subscription URL automatically, it responds back with feed containing optionally some or all of the content and a special signup item. The signup item contains users' individual URL and optional instructions on how to manually switch subscription URL in the client software. In either scenario, the client software can be configured to switch its subscription URL from the generic auto-discovery URL to an individual URL and all subsequent requests to the system 100 come through that URL.

Once the user is subscribed to their unique feed, they can customize it to fit their preferences, or it may be tuned automatically as discussed in relevant sections of this document. Each newly generated feed may be either initialized with some default personalization values or, alternatively, may try to determine optimal personalization preferences of the user based on variety of factors, including original source of the auto-discovery request (e.g. which section of the website the user was on), user's runtime properties, or make a heuristic estimate based on user's behavior (e.g. providing the user with default preferences that match other users with similar behavioral patterns).

It should be noted that any mixture of auto-discovery mechanisms outlined above can be used in conjunction to improve user experience and maximize chances of successful subscription. Factors influencing choice of the auto-discovery mechanism can consist of, but not limited to, run-time characteristics of the client software, publisher settings, system wide configuration, explicit choice by the user, and heuristic databases stored either locally within the system 100 or at an external resource.

Special care must be taken with automatic agents, including but not limited to crawlers and robots. When such an agent requests a personalization URL 322, optionally it should not be redirected 308a to the personalized URL 326, but instead given appropriate content immediately. Appropriate content can be configured to be all, none, or publisher and/or system defined subset of the content on the system (optionally based on a specific runtime characteristics of the particular automatic agent). Further, automatic agent can be optionally redirected to a special feed URL. This URL would identify that the feed as served to a particular automatic agent. Should a user find that feed though such automatic agent (for example from search or directory), their subsequent requests will be treated as auto-discovery requests for feed 322 and so they would be issued an individual URL 326. This is done to enable tracking the source of the signup (for example, to evaluate how users find out about presence of feeds on a particular site).

It is noted that another example of special handling of automatic agents is handling of the click-throughs on any URL or link in the feed. Such links can be rewritten by system 100 to facilitate tracking of user activity. For example, automatic user agents can be served with permanent redirect (e.g., HTTP status code 301)—e.g. to facilitate SEO (search engine optimization), while other user agents can be served temporary redirect (e.g., HTTP status code 302)—e.g. ensure accuracy of counting (by preventing user agent from caching the destination link).

Based on the user interests stored in the user interest database 120, the system 100 queries the content description database 112 for matching categories in order to find appropriate contents stored in the content database 108 to be provided to the user 104. The system 100 dynamically builds a content feed based on the user interests, translates the feed into appropriate feed format based on user information stored in the user profile module 116 and serves the appropriately formatted feed to the user 104 via the client-side agent. For example, the user 104 may cut and paste the unique URL into the client-side agent to obtain the personalized feeds. Alternatively, the system 100 may automatically insert the unique URL into the client-side agent without any user action.

In an alternative embodiment of the invention, if the user 104 requests the customization content from the system 100, the system 100 serves the client-side agent of the user 104 a cookie and adds the cookie's identifier to the user profile module 116. In response to the user 104 personalizing future feeds by choosing categories of interest, the system 100 reads the cookie residing on the client-side agent and serves the user 104 personalized feeds. Accordingly, the user 104 does not need to insert the unique URL into the client-side agent to obtain the personalized feeds.

Alternatively, the system 100 may authenticate the user 104 via a client-side digital certificate or a combination of user identifier and password. The client-side certificate or the user identifier and password may be stored in the client-side agent or other client resources, or may be requested from the user 104. Other authentication methods include security tokens, smart cards, etc. If the user 104 is successfully authenticated, the server 300 serves the personalized feeds to the user 104 via the client-side agent.

The personalized feeds provided to the user 104 can include encrypted information. Specifically, the content generation module 106 obtains content pieces from a source and tags the content pieces with machine-readable tags before storing them in the content database 108. The machine-readable tags alert an encryption module (not shown) to encrypt some or all of the data in the content pieces. The user information stored in the user profile module 116 also includes security attributes such as encryption keys, digital certificates, security tokens, user identifier, password, biometrics, etc.

In response to the user 104 requesting personalized feeds, the encryption module encrypts the content pieces stored in the content database 108 (if not already encrypted) using the security attributes of the user 104. The encrypted contents are then provided to the client-side agent as feeds via an encrypted or non-encrypted transport. The client-side agent then uses the appropriate security attributes to decipher the contents. Accordingly, the publisher 102 may use feeds to sell and distribute confidential and/or rights-protected information to the user 104.

The system 100 may also provide contents to the user 104 indirectly. For example, instead of directly providing contents to the user 104 within a feed, the feed may include a link to encrypted or unencrypted contents residing on the content database 108. By providing a link to the contents instead of directly providing the contents to the user 104, the user 104 is prevented from saving or transferring the contents. The system 100 may further record the decryption of contents by the user 104 in the user action database 122 for reporting and analysis purposes. Furthermore, communications between the user 104 and the system 100 may take place over encrypted communication channels such as a secure sockets layer ("SSL") or virtual private network.

In an embodiment, an authentication module (not shown) may establish a content creator's authenticity using a variety of methods such as digital signatures. Authenticated content is stored in the content database 108 and requested by the user 104. Based on the characteristics of the client-side agent, the system 100 serves a feed to the user 104 via a secure or insecure transport with contents that may be authenticated by one or more third parties. Thus, the client-side agent is able to verify if the original creator of the contents actually produced the contents, even if the contents are provided to the user 104 via one or more third parties.

The system 100 can track the user 104 via the unique identifier 114, for example, a unique URL, cookie, client-side certificate, IP address, user identifier and password, machine fingerprinting etc. Feed and web site usage are recorded in the user action database 112 (which may be flat file, relational, XML, etc.) and used for reporting and analysis purposes. In addition, the customization content may be provided to the client-side agent on a regular basis to encourage the user 104 to update the feed personalization. Alternatively, the customization content can be provided to certain users based on the customization rules of the publisher 102. For example, the customization content can be provided to users who have below average feed open rates or click through rates. Alternatively, customization content may be embedded with the regular content (either always, or by following some publisher-defined rules). This embedding may happen in either all or some of the regular content. Examples of such embedding include at the top of the content, side-bar, in the middle of content or at the bottom of content.

The system 100 is adapted to evaluate if a feed provided to the user 104 is relevant to the interests of the user 104. In particular, each feed provided to the user 104 is evaluated for relevancy through ways that are transparent to the user or through explicit user feedback. Based on these methods, the system 100 can provide feeds that are optimized for each user. Explicit user feedback may include responses to textual or graphical questions regarding the content relevancy (e.g., yes/no responses, numerical ratings, letter grade ratings, sliding scale of relevancy, etc.) and written comments. In an embodiment, the publisher 102 selects a feedback method that is inserted into a feed provided to the user 104. The user can review the feed, rank the relevancy of the feed, and provide 314 a feedback to the system 100. The user feedback is stored in the user action database 122 for reporting and analysis purposes and for intelligently determining categories that are of interest to the user 104. Based on the user feedback, the system 100 continuously updates 316 the feed contents to provide personalized feeds to the user 104.

An explicit user feedback is scored, normalized, weighted, and added to information collected from the user 104 transparently through server redirects, the unique URL, client-side certificate, user identifier and password, cookie, IP address, machine fingerprint, etc. Information collected transparently may include whether, when and/or how often the user 104 opened a feed, whether, when and/or how often the user 104 unsubscribed a feed or changed his or her personalization setting, whether, when and/or how often the user 104 clicked on a link in a feed and his or her actions during and after landing on the linked web site, as well as whether, when, and/or how often they recommend or forward this content to others. The combined data is compared with the data from other users and scored based on similarities and heuristic rules to determine trends and likely actions of the user 104. Based on historical trends of feed use, correlated actions by users and the heuristic rules, the system 100 develops experience rules and records the developed rules in the user action database 122.

If the user 104 requests personalized feeds, the system 100 queries the user action database for the appropriate record, and based on the experience rules, queries the content description database 112 for categories that match the experience of the user 104. The system 100 dynamically builds a feed including contents that are associated with the matching categories, translates the feed into an appropriate feed format based on information stored in the user profile module 116, and serves the personalized feed to the user 104 via the client-side agent. The system 100 can further send customization content to the user 104 for re-personalization by the user 104. The system 100 can thus adjust content inserted into the personalized feeds provided to the user 104 to encourage trends and actions desirable to the publisher 102.

Figure 4:
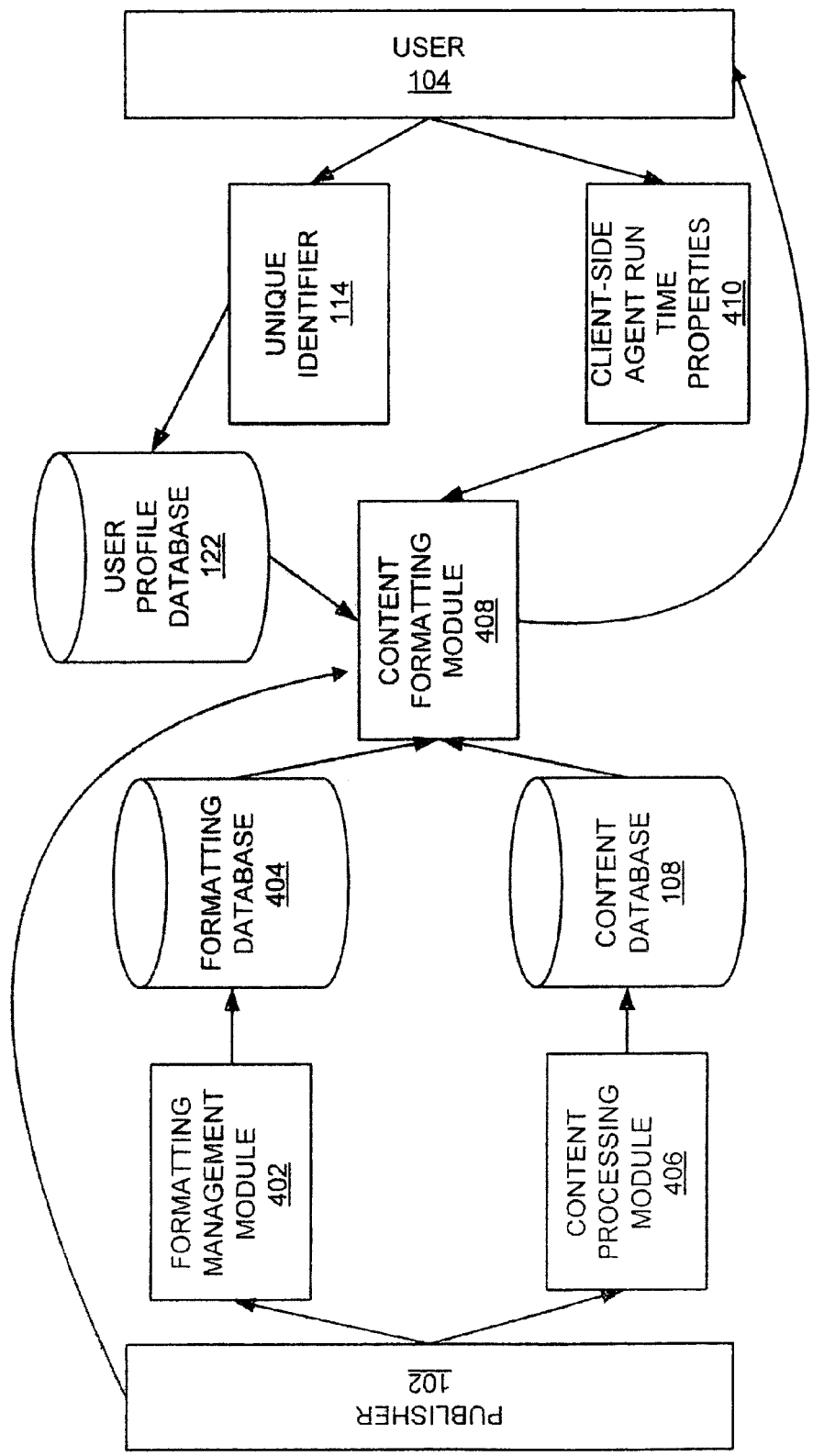
FIG. 4 illustrates one embodiment of an architecture for formatting feed contents to be provided to a user in accordance with the present invention.

FIG. 4 illustrates an architecture for formatting contents to be provided to the user 104 via personalized feeds in accordance with an embodiment of the invention. As shown, the publisher 102 manages a set of formatting templates via a formatting management module 402. The templates may include various styles and formatting, sections of content including, but not limited to text, images, audio and video, as well associated workflow rules. The available templates are then stored in a formatting database 404.

Based on the structure and/or formatting of a particular piece of content, a content processing module 406 parses the content piece and removes styles and formatting as necessary based on a set of data structure and format specific rules. For example, the content processing module 406 decomposes each content piece into various components. The processed content piece is then stored in the content database 108. In addition to selecting optimal formatting for content delivery, the system 100 may also select optimum time for delivery based on various rules. This may include delaying or not including at all some content based on the same factors as above.

A particular example of dynamic format and delivery timing variations is format and delivery based on the status of a user's subscription. The publisher may choose to configure the system to construct various tiers of subscription, whereby the higher tiers receive full information without delay, while lower tiers may receive the information with progressively increasing delay. Additionally, the information included in the feed may be reduced for lower tiers, e.g., switching from full text feeds, to summary feeds, to title only feeds. Further, some content items may be excluded from lower tiers. This differentiation can occur on a per content item and/or on a per subscription basis. Therefore, it is possible in the above example to have a subscription tier with some items being full content and appearing instantly, while others being title only and appearing with some time delay.

In response to the user 104 requesting a feed, a content formatting module 408 selects an optimal component of content stored in the content database 108 and an optimal formatting stored in the formatting database 404 based on a variety of factors. Such factors may include the user profile stored in the user profile module and user actions tracked via the unique identifier 144. The factors may also include runtime properties 410 of the client-side agent, such as the client-side agent's capabilities, database state, geographic location, authentication, encryption, rendering state, digital rights management ("DRM"), and other factors that may influence the optimal components and formatting.

In one embodiment, the content may be converted in full or in part to an alternate format for any number of reasons, including to support users whose client software does adequately support a certain format. Examples of such conversion include converting some or all text, HTML and/or images to single or multiple images in the case where client does not support certain text formatting. Another example is converting some or all of the content to a partial or complete audio or video stream or file to work with non-text based clients. Another example is transcribing all or parts of an audio or video stream to a text format to support clients that do not have audio and/or video support.

In another embodiment, all or part of the content may be converted to a non-text format with embedded readily identifiable or invisible watermarks. These embodiments of format conversion and watermarking may discourage, and/or enable tracking of, authorized or unauthorized content re-distribution. Examples conversion formats include one or more images, one or more partial or complete audio and/or video streams or files, or various other formats that include rights protection mechanisms such as Portable Document Format (PDF) from Adobe Systems Incorporated (San Jose, Calif.).

Optionally, the conversion may include steps to prevent conversion back to the original format. These steps include, for example, adding analog noise and/or distortion to the format. The noise and/or distortions makes automated conversion back to the original format difficult without interfering with human consumption of the information. In addition, the system can introduce random elements to the conversion to make automated conversion to the original format more difficult. Examples of randomness include, for example, breaking up an image into multiple randomly shaped parts, breaking up an audio and/or video stream into multiple random length segments, or mixing different techniques formats and techniques (e.g., converting part of the item to an image and part to an audio stream). The system may be configured to use many sources to generate randomness, for example, a combination of content item identification and unique feed identifier.

Once the content is converted to these non-text formats, a watermark (e.g., as previously described) can be embedded into the content for a variety of purposes, including enabling easy identification of the original source of this content. Readily identifiable watermarks (e.g., content meta data, background images and/or sounds, explicit mentions of the user's personally identifiable information, etc.) serve to deter the users from sharing content they receive w/o prior authorization. Hidden watermarks (e.g. seganographically embedded unique feed identifier) can serve many purposes including facilitating investigation into where the unauthorized content re-distribution originated.

The content formatting module 408 maps the content piece to appropriate fields in the templates stored in the formatting database 404. The content formatting module 408 decides which template applies to a piece of content automatically or manually based on the preferences of the publisher 102. The feed personalization module 124 then generates a feed with appropriately formatted content and provides it to the user 104, optionally subject to restrictions in the user profile stored in the user profile module. For example, the user 104 may not have rights to receive the requested content, or may not have rights to receive the content at that time. Thus, the system 100 is able to receive data that may be variously structured or formatted (e.g., dbase, word processing documents, audio stream or file, video stream or file, images, HTML, email, RSS feed, XML, etc.) and output a feed whose appearance is consistent with an entity's style guidelines for a given type of communication. And the system 100 is able to provide content whose format or structure is appropriate for the client-side agent of the user 104.

Figure 5:
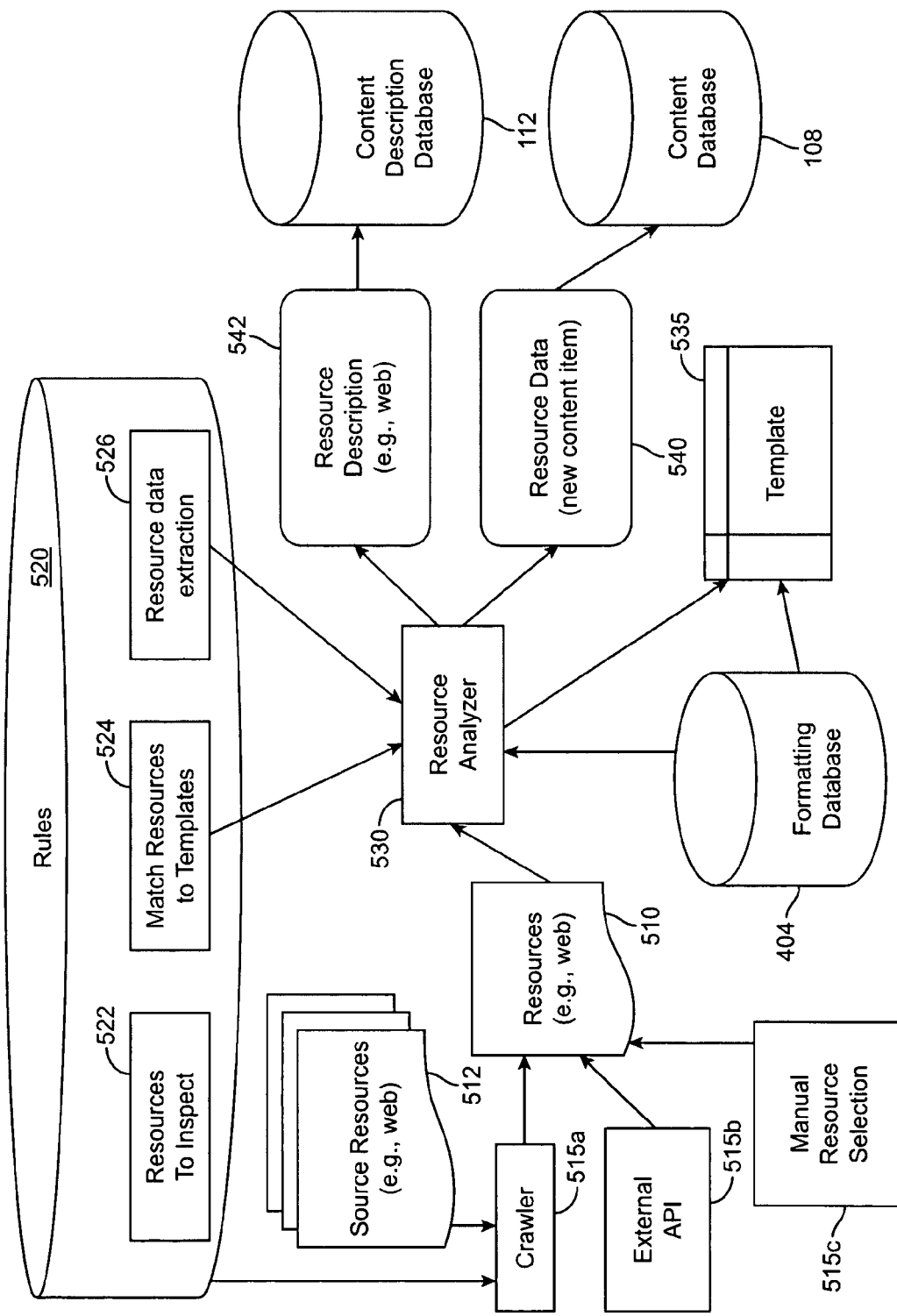
FIG. 5 illustrates one embodiment of an architecture/process for extracting information from a resource and for incorporation with a template to generate a finished content item in accordance with the present invention.

FIG. 5 illustrates one embodiment of an architecture/process for extracting information from a resource 510 and applying content formatting rules to generate a finished content item in accordance with the present invention. The resource 510 can be any resource, for example, a web page, email, RSS feed, document, partial or complete video or audio files or streams, graphics, database, content management system (CMS) etc. The resource 510 can be a newly created resource or one that has been updated. The resource 510 includes one or more data elements (or information) that can be extracted as described herein. It is noted that the resource can be any structured or unstructured content.

The resource can be provided to the system through automated or manual processes. For example, a crawler 515a receives instructions from a rules engine 520 as to which resources to inspect 522. The criteria can include, for example, which source resources 512 to check for new or updated information, the types resources to check, the frequency checking, and the extent of changes. The crawler 515a crawls one or more source resources 512, e.g., web sites identified through URLs in the resources to inspect 522 instructions from the rules engine, to identify one or more particular resources 510, e.g., an updated or new web page.

In an alternative embodiment, the system may be configured to include an external application programming interface (API) 510b that receives updated or new resources 510. In still another embodiment, the system is configured to include a mechanism for manual resource selection 510c that provides a user interface or other mechanism to select an updated or new resource 510. In still another embodiment, the system 100 waits for the user 104 to make a request for the feed, and then contacts external sources for the relevant resource 510 to be added as content. One of many examples of such system would be a feed for a financial institution containing transactions for each user. At the time the user makes a request for the feed, the system goes out to the financial institution and fetches a list of transactions for that user. These transactions are then imported as content into the system.

To further illustrate the robustness of the described configuration, FIG. 5 illustrates one embodiment of a process for on demand resource retrieval in accordance with the present invention. When user 104 makes a request for the feed, the dynamic resource requester then contacts the publisher 102 via some resource API (this API may include, for example, web requests, SOAP, RPC, REST, XML-RPC and other mechanisms). The publisher's resource API responds with resource (or resources) 510. This resource is then processed by the resource analyzer 530 to produce a finished content item (or items). These items are then included into the user's personalized feed 126 and sent back to the user in a response.

Once the resources 510 are identified, the rules engine 520 invokes a module having rules to match 524 a particular resource with a template from one or more predefined templates in the formatting database 404. The rules engine 520 may contain pre-built rules based on commonly used data structures and/or may contain rules created by the publisher and/or rules provided dynamically via an API or an external resource. The pre-defined templates may be incorporated with the system, may be commercially available templates or may be user-defined predefined templates. The templates are structured as described above and include fields that will be populated, combined or merged with data elements from the resources 510 to ultimately create a feed. Instructions or criteria for matching may be determined by type of resource and characteristics of the resource.

By way of example, consider a resource that is a web site having a web page for product offered for sale. On the web page is product related text such as price and description along with product images. The rules engine 520 module for matching 524 resources to templates searches the formatting database 404 for a template that includes fields for product descriptions, pricing, and images. In another example, a resource may be an audio file that includes a predetermined time or length of silence between segments. The rules engine 520 module for matching 524 resources to templates searches the formatting database 404 for a template that includes fields for integrating audio streams based on identification of silence of a predetermined length or time. In still another example, a resource may be a video having a blanking interval or a video stream with blank frames of a predetermined length or time. The rules engine 520 module for matching 524 resources to templates searches the formatting database 404 for a template that includes fields for integrating video streams based on identification those blanking intervals or frames.

Once an appropriate template 535 is selected, a resource data extraction module 526 in the rules engine instructs the resource analyzer 530 to extract data elements corresponding to appropriate fields in the template 535 from the resource 510. The resource analyzer 530 determines a resource description 542 of the contents within the resource 510 to assign it to a category. This information is entered into the content description database 112. The resource analyzer 530 also extracts data elements 520 from the resource 510 that corresponds to fields in the template. This data is entered into the content database 108.

Once the resource analyzer 530 completes its operation, the resource 510 is categorized in the content description database 112 and the data elements of the resource 510 extracted and stored in the content database 108. The system now has the necessary components to create a feed as previously described using the appropriate template from the formatting database 404 and data in the content description database 112 and content database 108.

To help develop efficiencies, in some embodiments the resource can be structured so that it is updated once in a resource and available for use by the system for appropriate analysis, categorization and extraction as described above. For example, consider an example of a publisher that seeks regularly maintains a resource, which also includes data that may be suitable for RSS feeds. In one embodiment, the publisher may insert semantic or structured data into resource via mark-up, references, or other means. The reference to mark-up includes, for example, meta tags, re-using existing HTML/XML tags, and adding custom attributes to existing HTML/XML tags creating custom HTML/XML tags.

The information can be inserted into resources 510 (or content), e.g., some or all web pages, email, RSS feed, documents, databases, content management systems (CMS), images, partial or complete audio or video content or other web content, either manually or through automated methods scripts or changes to a content management system. The mark-up may contain information necessary for RSS feed creation. This may include, for example, a title, date, summary, content, enclosure, author and subject. The resources 510 are optionally marked-up with standard and/or publisher definable semantic information, for example, content categories, layout information, templating information, digital rights management information, inclusion or links to related resources, access restrictions.

The mark-up and the associated data or the entire web content can be restricted to be only visible by approved parties by using any number of authentication mechanism, for example, source IP address, user agent, HTTP or HTTPS authentication, request parameters, digital certificates and other means of authentication. Further markup and the associated data can be partially or fully encrypted using public or private cryptography and/or digitally signed to ensure authenticity and integrity. Alternatively, the semantic and/or structured data can be part of normal structure and/or content of the page and specified using pre-configured rules for finding it. Examples of such rules include regular expressions, XPath expressions, time intervals (for audio/video content), and audio/video signal matching (e.g. predefined set of tones).

In one embodiment, the semantic and/or structured information can be contained in a separate resource, for example, other web resource and local or remote data stores. The linking of the web page to such resource can be accomplished either via explicit referencing of the resource location in the page itself, for example, meta tags, custom XML/HTML tags, as attributes to existing tags, or via a prearranged rules, for example for a page 'http://www.company.com/page.html' the semantic resource would be stored at 'http://semantic-.company.com/page.html'. Alternatively, the separate resource may contain rules for extracting the necessary semantic information from the page, rather than semantic information itself. For example, the web resource may contain regular expression or XPath expression needed to extract a particular piece of semantic content from the page.

Any combination of the above mechanisms can be used within the same page—some of the semantic may be included on the page with special markup, some may be part of the normal content of the page and some may come from an external resource. Thus, some may directly come as semantic content in that resource and some as instructions to extract semantic content from the page itself.

With the resource 510 structured as noted above, the crawler 515 can be configured to crawl the target web site recording some or all of the web site content into a database. Optionally, crawling can be limited to only some sub-sections of the site. Furthermore, multiple disjointed subsections can be used to extract content items. Also, some pages may be designated to be either crawled and analyzed, or only crawled through (without analyzing) or not crawled any further. These restrictions on which pages are crawled and whether they are analyzed can be based on rules in the rules engine 520 as to resources to inspect 522, and may include, for example, page URLs, page content, page structure, image/audio/video pattern, or content size. The site may be re-crawled at regular intervals to ensure that all the information stored is current. Alternatively, rather than crawl all or parts of the web content, the system can check external source of information for additions, removals or changes or relevant pages. The rules controlling which pages are crawled, just like the rules controlling how to process resources, can be either created by a publisher and/or provided dynamically via an API or an external resource.

Every page (or web element) is crawled and entered into the database as a content item utilizing the semantic information to construct the look and feel, categories, and other presentation information for the item. The system potentially constructs content items out of the extracted semantic information. There does not need to be a direct correlation between web resources and content items. Multiple content items can be constructed out of a single resource, e.g., when parsing a directory listing a separate product can be extracted into separate content items. Further, determination of timestamp/ applicability can happen for each content item individually. For example, if the source resource contains a catalog and the rules are configured to convert each entry into an individual item, addition of new entry to the catalog (or modification of only one entry) would cause only one content item to be added (as opposed to re-importing all entries due to the fact that the version/timestamp of the page has changed). Alternatively, multiple resources can be combined into a single item, e.g., if a particular product description is spread across several pages such as description, images, specifications, price, it may be assembled as a single content item.

Alternatively, an email client can be used to receive new resources. For example, they system may receive updates via newsletter. This newsletter will be parse in the manner describe earlier and the content entered into the system as one or more content items. In still an alternative embodiment, an RSS client can be used to receive new resources. For example, the system may subscribe to some external RSS feed. Once a new item is entered into the external feed (or an existing one is updated), the system can apply the techniques described to enter new content into the system as one or more content items.

Once the item is created, the content description builder module 10 constructs a semantic description of the content for the content description database 112. In one embodiment, the system is configured to build an index that potentially gives greater weight to the mark-up. In particular, the index may be scored and/or ranked based on a variety of factors. For example, inbound and outbound links, keyword frequency, content age and other factors. Each item is analyzed syntactically and semantically to enable searching. When the user enters a search query, a custom feed is constructed for them based on the query parameters and their matches and/or relevance to the syntactic and semantic indices.

In alternative embodiments, the system is configured to enter found or changed pages as new content items (including potentially meta information such as title, author and categories) utilizing the semantic information to construct the look and feel, categories, and other presentation information for the item. As previously noted, a one-to-one correlation between resource content and content items is not necessary. Changes in the resource content can be detected by various methods, for example, comparison with previous versions including parts of the resource content, comparison of pre-computed hashes of the resource content or part of the resource content with earlier computed versions of these hashes, special sections of the content or meta content indicating age, time stamp of creation or modification or status of the page, or external source of information indicating creation time stamp, modification time stamp or changes of content for the resource content.

Alternatively, rather than crawl all or parts of the resource content, the system can check external source of information for additions, removals or changes or relevant pages. For a resource that contains multiple content items, the determination of changes or additions to individual items is independent of each other, as described earlier. Further, different methods can be used for different items in the same resource (e.g. some items may have embedded meta information regarding its insertion or update date, while others could be check by direct comparison with previously imported versions).

With the information for the template collected and populated, a prospective subscriber is alerted to availability of content deliverable. The alert and delivery may be via syndicated feeds, web pages, simple messaging service (SMS), multimedia messaging service (MMS), or other content delivery mechanism that may be configured based on textual description, buttons, images or automatic detection of a user agent.

The prospective subscriber can optionally personalize an RSS feed through checkboxes, classification navigation or keyword(s) (e.g., search) request as described previously. After the optional personalization, the feed can be provided via general or unique URL. Content may be served via a feed, electronic mail (email), a web site or mobile messaging channels such as SMS or MMS based upon the user requested data and the score or rank of the content. Using semantic information and optionally the predefined templates, the system serves content in a manner most applicable to the selected delivery medium and user and system properties and preferences. In addition, as noted, use actions can be recorded and there may be continuous revisions of the feed score or rank.

Figure 6:
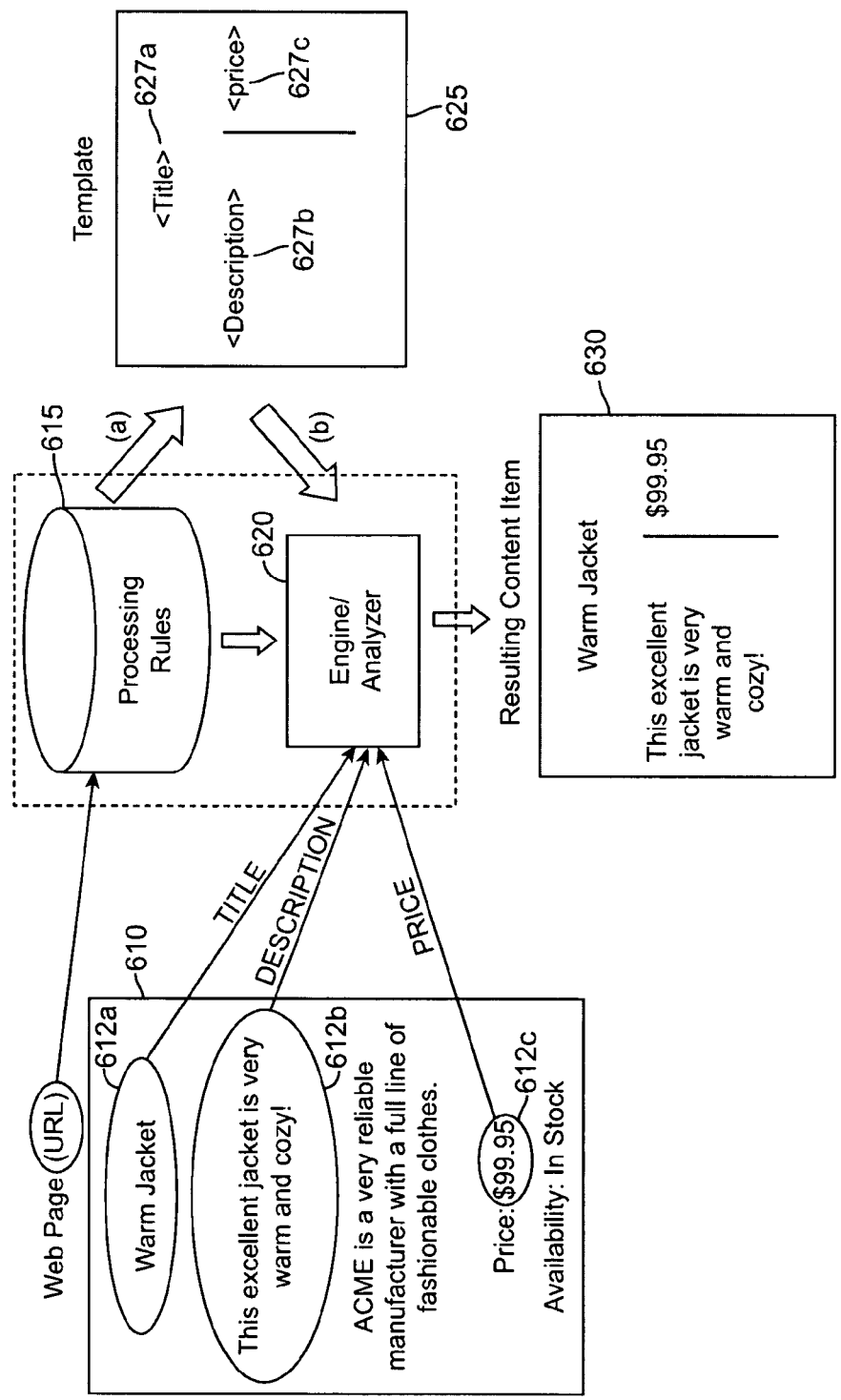
FIG. 6 illustrates an example of extracting information and generating a feed using a template in accordance with the present invention.

FIG. 6 illustrates an example of extracting information and generating a feed using a template in accordance with the present invention. In this example, a web page 610 is the resource. The web page 610 is identified as a resource through its URL in this example. The URL is processed through processing rules 615 that match (a) the web page URL (and optionally information therein) with a template 625 from one or more templates stored in a templates database. When a suitable template 625 retrieved (b) from the templates database, resource extraction rules from the rules engine are retrieved for application through a resource analyzer 620.

Using the rules, the resource analyzer 620 identifies fields 627a-c in the template 625. The resource analyzer 620 extracts (c) data elements 612a-c from the web page that corresponds with the relevant fields 627a-c in the template 625. This process generates the resulting content item 630, which is now suitable for delivery, for example, as a RSS feed or other immediate communication protocol or vehicle. Thus, the disclosed configuration advantageously generates immediate information, e.g., as a feed, from structured or unstructured data through application of that data to predefined templates that appropriately package the information for delivery.

The system 100 is able to deliver feeds at levels of service despite unpredictable requests from user agents. When the request for feed is received, system 100 checks its current usage level and/or bandwidth utilization and/or quality of service requirements and decides if the feed should be served immediately or if the feed serve should be delayed. If the answer is to delay, system 100 can communicate to the client its inability to respond with content (due to load or other conditions).

In one embodiment of the system the system 100 sends back an HTTP redirect to the user agent (possibly after small delay) to come back to the server. This causes the user agent to (transparently) re-request the feed from the server again. This process can be repeated as many times as needed. Other methods include the creation of a specialized pre-arranged protocol between the system 100 and the user agent for retry or delay in streaming data back (e.g., send the data back slowly). To prevent a user agent from never getting a feed, a counter (e.g., in redirect URL, in the cookies, or stored in the server's internal table associated with each unique feed identifier). Once the timeout is exceeded, the feed would be returned immediately.

Figure 7A:
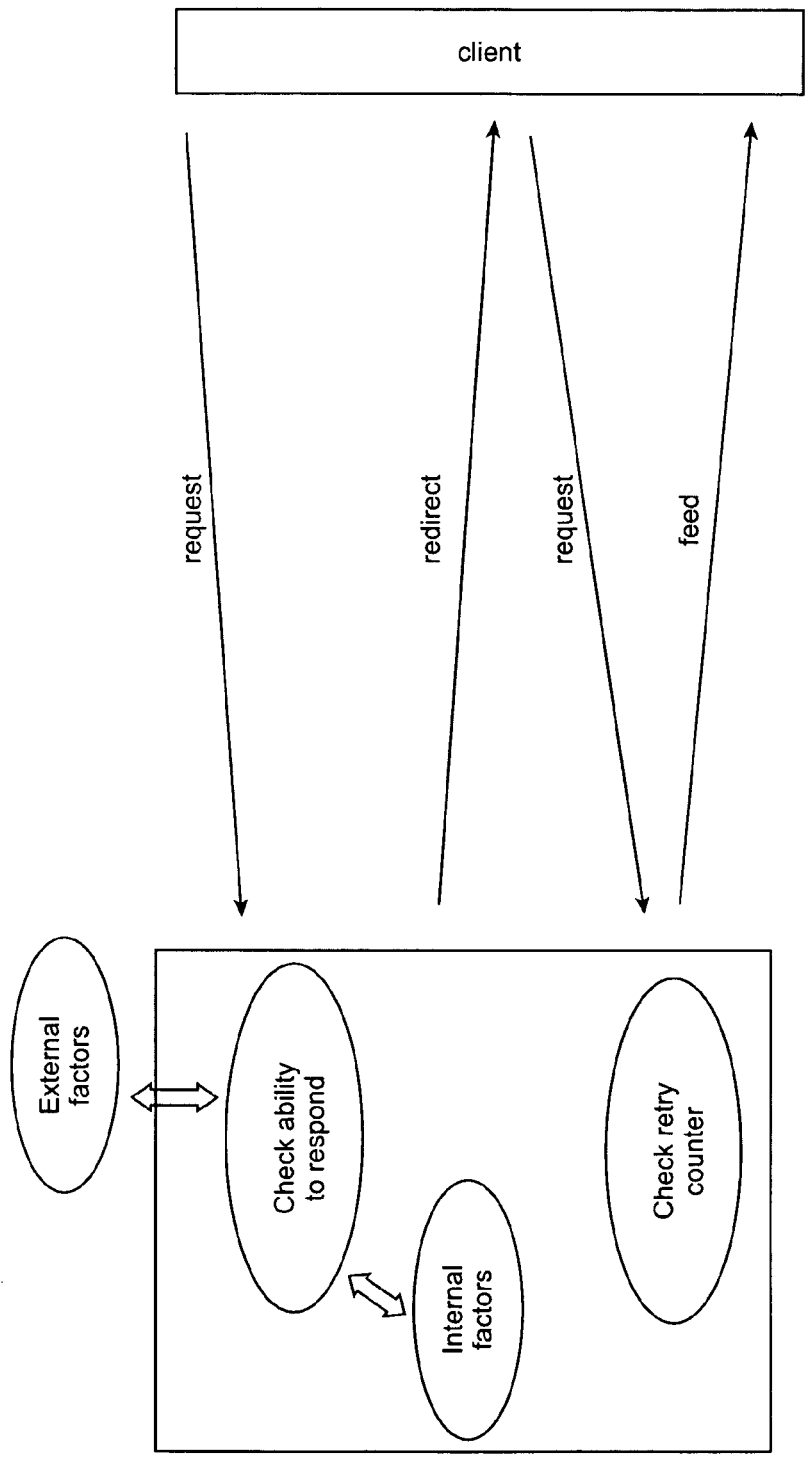
FIG. 7a illustrates one embodiment of handling load and availability of feeds in accordance with the present invention.

FIG. 7a illustrates one embodiment of an architecture for handling load and availability of feeds in accordance with the present invention. In particular, a client sends a request for a feed. The system 100, determines whether it has an ability to respond in view of internal factors, e.g., bandwidth or database availability, and external factors, e.g., times at which a particular feed may be made available. In view of this analysis, the system 100 can send back a response, e.g., a redirect, that may have the client continue trying to request the feed. The system 100 may track the number of attempts a client tries to obtain a feed using a counter. It is noted that the system can be configured to serve the feed within the bounds of the internal or external factors after a predetermined number of retries of the request from the client.

Figure 7B:
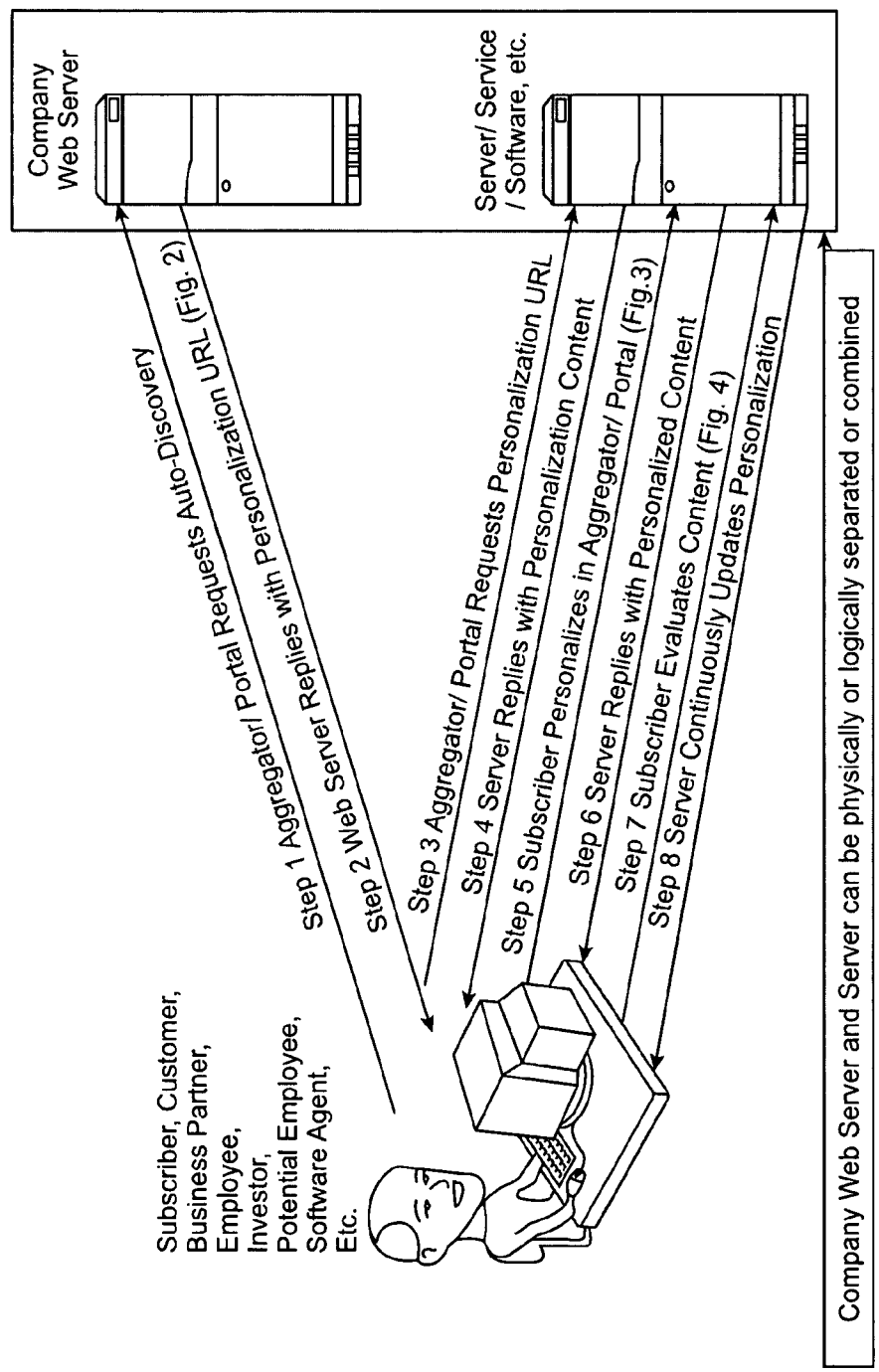
FIG. 7b illustrates one embodiment of an exemplary flow chart for an entity to provide a personalized feed to a user in accordance with the present invention.

FIG. 7b illustrates an exemplary flow chart for a company to provide a personalized feed to a user such as a subscriber, customer, business partner, employee, investor, potential employee, software agent, etc. In step 1, a software agent such as an aggregator or a portal of the user sends a request for auto-discovery to the company's web server. In step 2, the company's web server replies with a personalization URL. In step 3, the software agent requests the personalization feed from the company's server, service, or software.

In step 4, the server, service, or software replies with customization content or personalization content. In step 5, the user personalizes his or her desired content at the software agent, and the software agent submits the desired content of the user to the server, service, or software. In step 6, the server, service, or software replies with personalized content or a URL for a personalized feed. In step 7, the user evaluates the replied content and provides the evaluation to the server, service, or software. And in step 8, the server, service, or software continuously updates the feed content according to the user's evaluation.

Figure 8B:
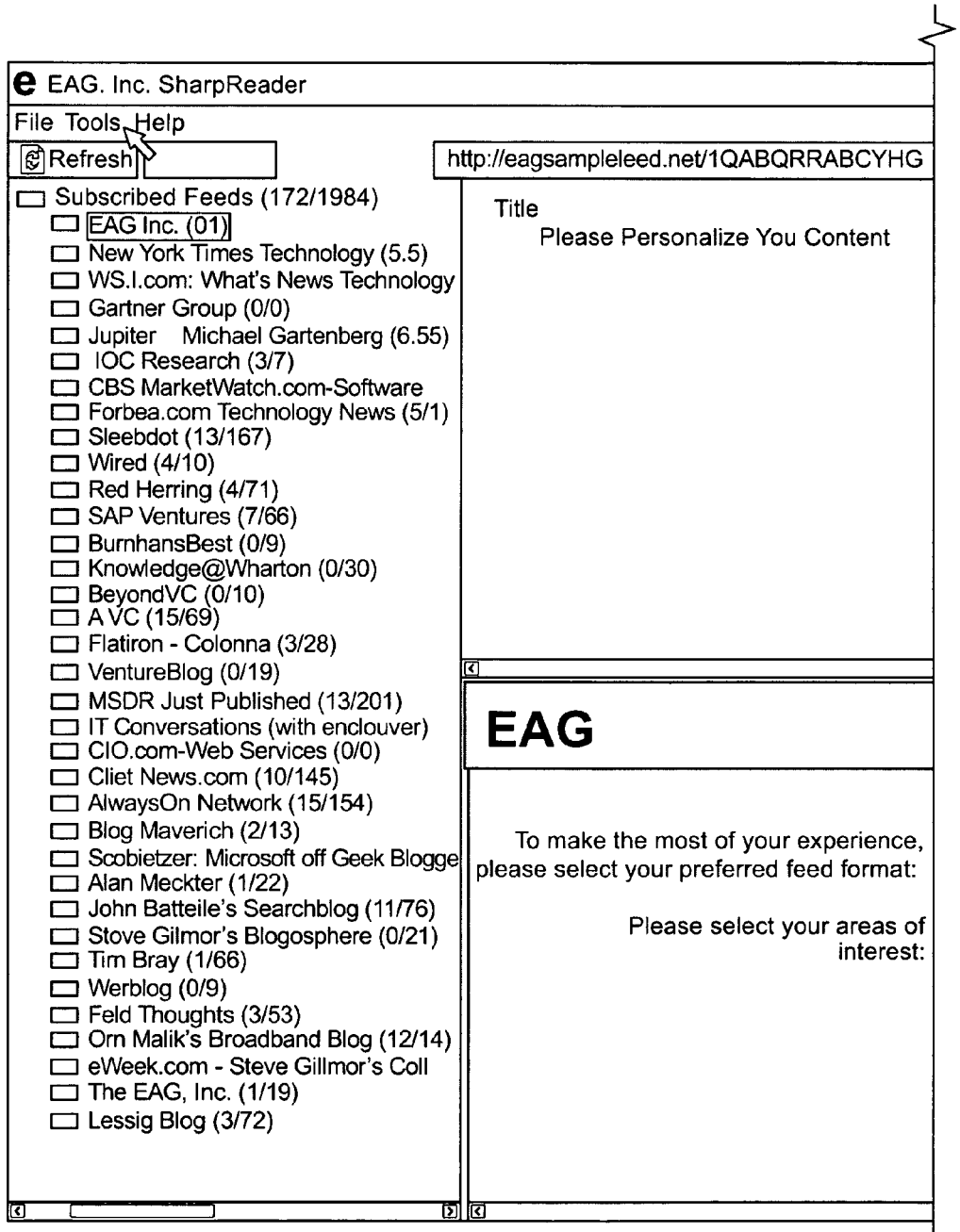
FIG. 8b illustrates one embodiment of the screenshot of exemplary customization content sent to a user via a feed in accordance with the present invention.
Figure 8B:
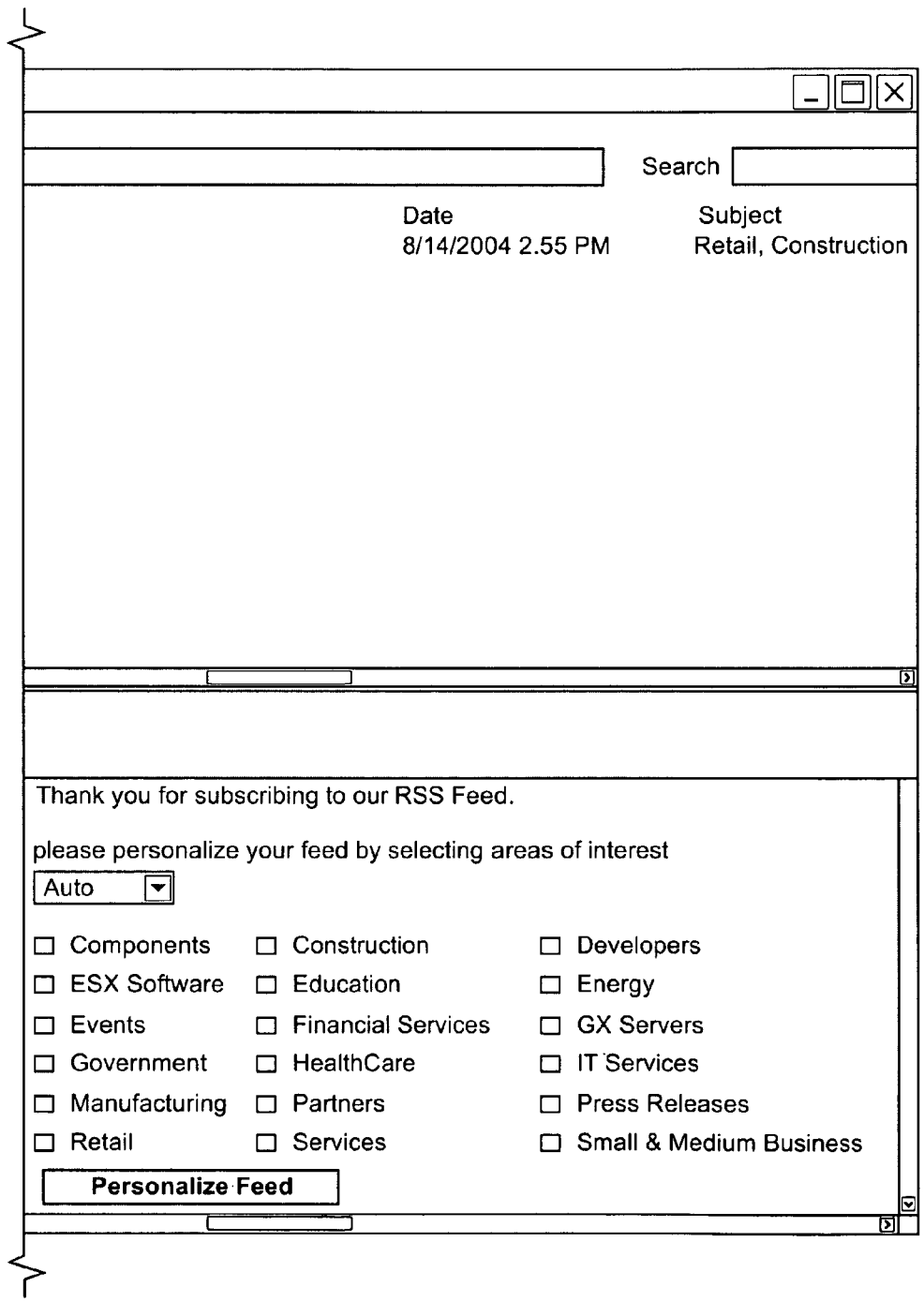
Figure 8C:
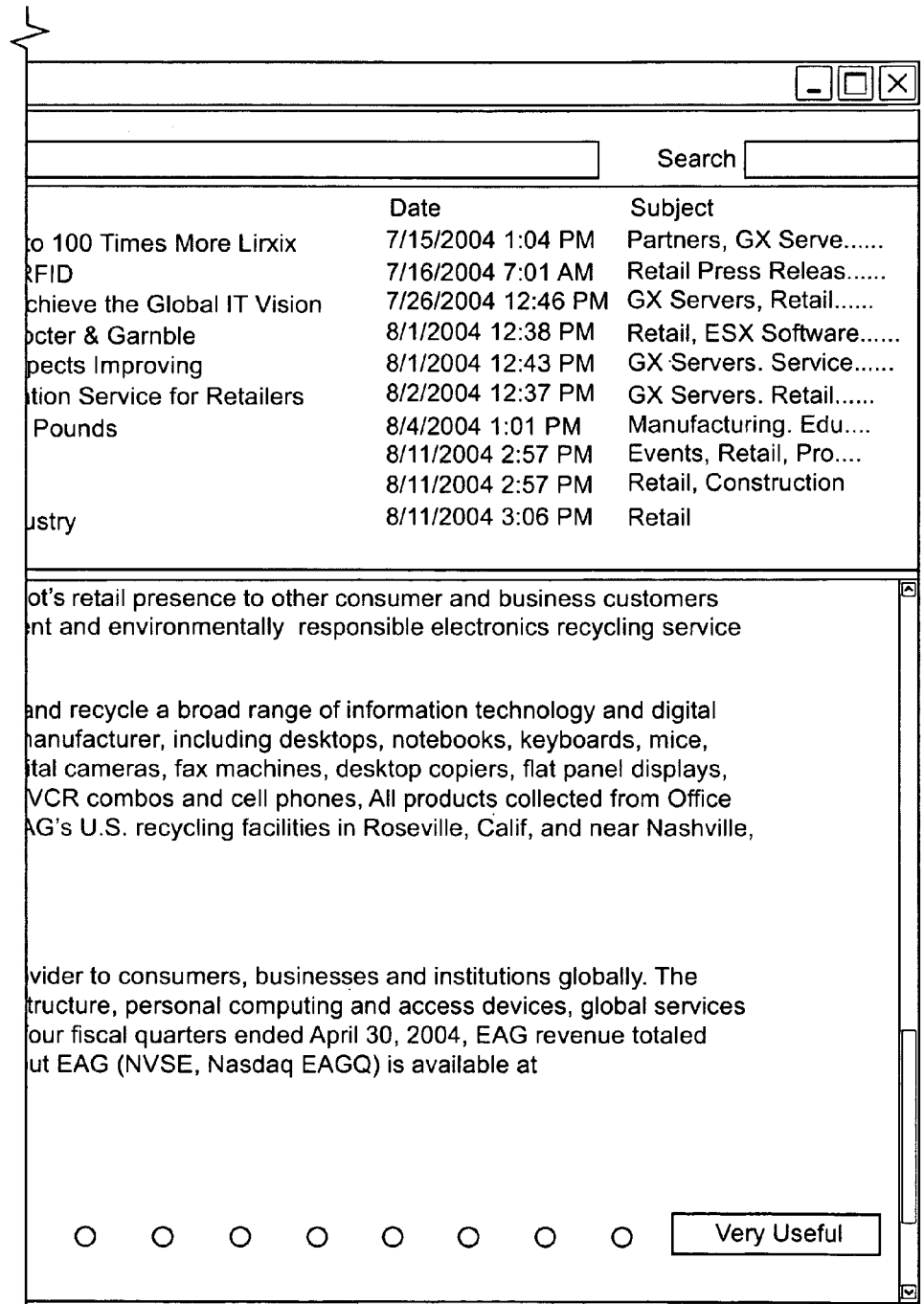
FIG. 8c illustrates one embodiment of the screenshot of an exemplary feed provided to a user that allows the user to rank the relevance of the feed in accordance with the present invention.

FIG. 8a illustrates an exemplary HTML document with the appropriate HTML tag that indicates the support of auto-discovery. FIG. 8b illustrates the screenshot of exemplary customization content sent to a user via a feed, according to an embodiment of the invention. In this exemplary screenshot, the user can select categories that are of interest to him or her by checking the appropriate checkboxes. FIG. 8c illustrates the screenshot of an exemplary feed provided to a user. In this exemplary feed, the user can rank the relevance of the feed by checking the appropriate checkbox indicating the feed's usefulness.

Figure 9:
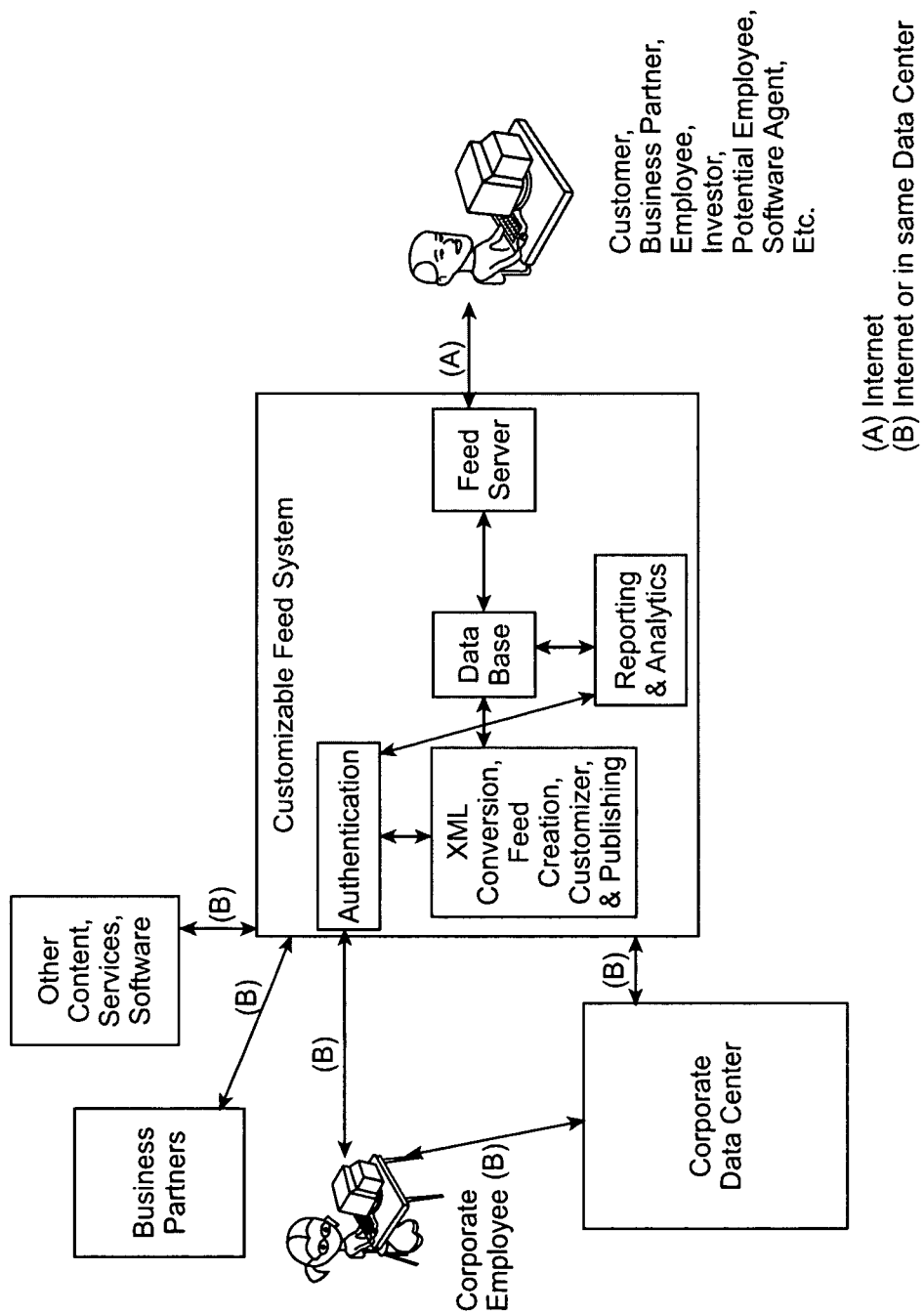
FIG. 9 illustrates one embodiment of an exemplary architecture of a customizable feed system and its interactions with various entities and constituencies in accordance with the present invention.
Figure 10:
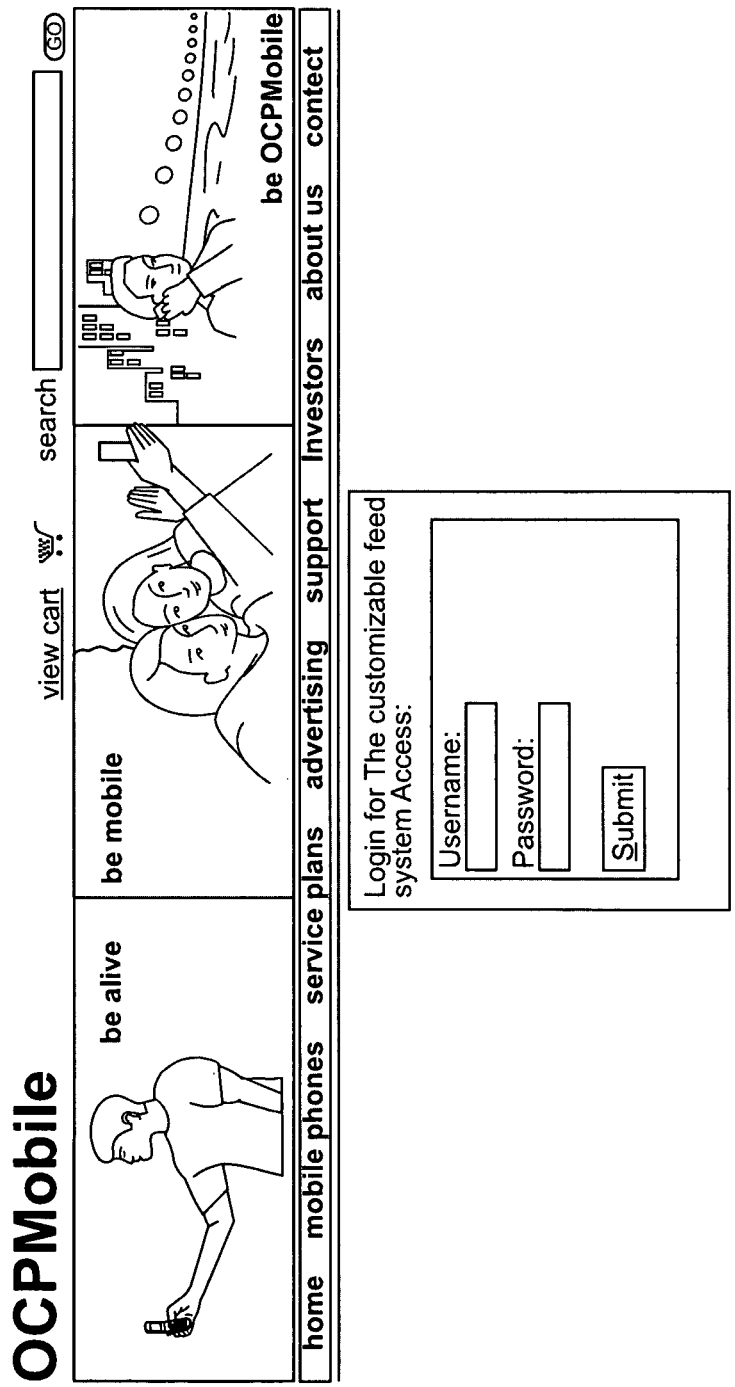
FIG. 10 illustrates one embodiment of the screenshot of an exemplary web page that allow a publisher to login to a customizable feed system in accordance with the present invention.

FIG. 9 illustrates an exemplary architecture of a customizable feed system (e.g., the system 100) and its interactions with various entities and constituencies. FIG. 10 illustrates the screenshot of an exemplary web page that allow the publisher 102 to login to the system 100 according to an embodiment of the invention. FIG. 11 illustrates the screenshot of an exemplary web page of the system 100 that allows the publisher 102 to view existing feeds, create new feeds, review alerts and updates about the system 100, and generates reports for analysis.

Figure 15:
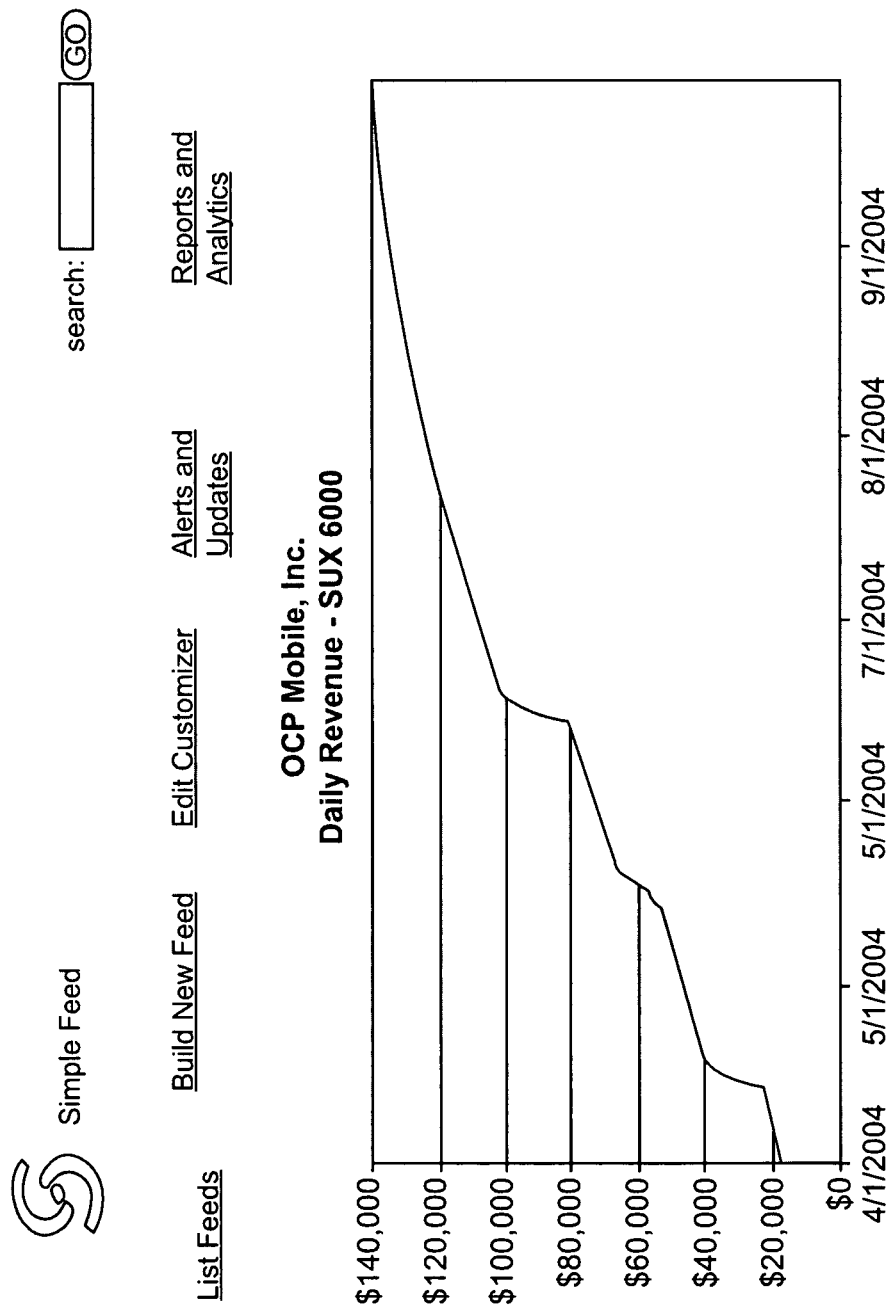
FIG. 15 illustrates one embodiment of the screenshot of an exemplary report in graph form in accordance with the present invention.

FIGS. 12a and 12b illustrate screenshots of exemplary web pages of the system 100 that allows the publisher 102 to create, categorize, and publish a feed. Also shown (in FIG. 12b) is one embodiment of using selection boxes to tag content. FIG. 13 illustrates the screenshot of an exemplary web page of the system 100 that allows the publisher 102 to specify the data source of a feed and to customize the feed's format (e.g., the feed's "look and feel"). FIG. 14 illustrates the screenshot of an exemplary web page of the system 100 that allows the publisher 102 to generate a report on feed use by specifying the feed, starting date, ending date, the type of report, and the format of the report. FIG. 15 illustrates the screenshot of an exemplary report in graph form generated by the system 100.

Figure 16:
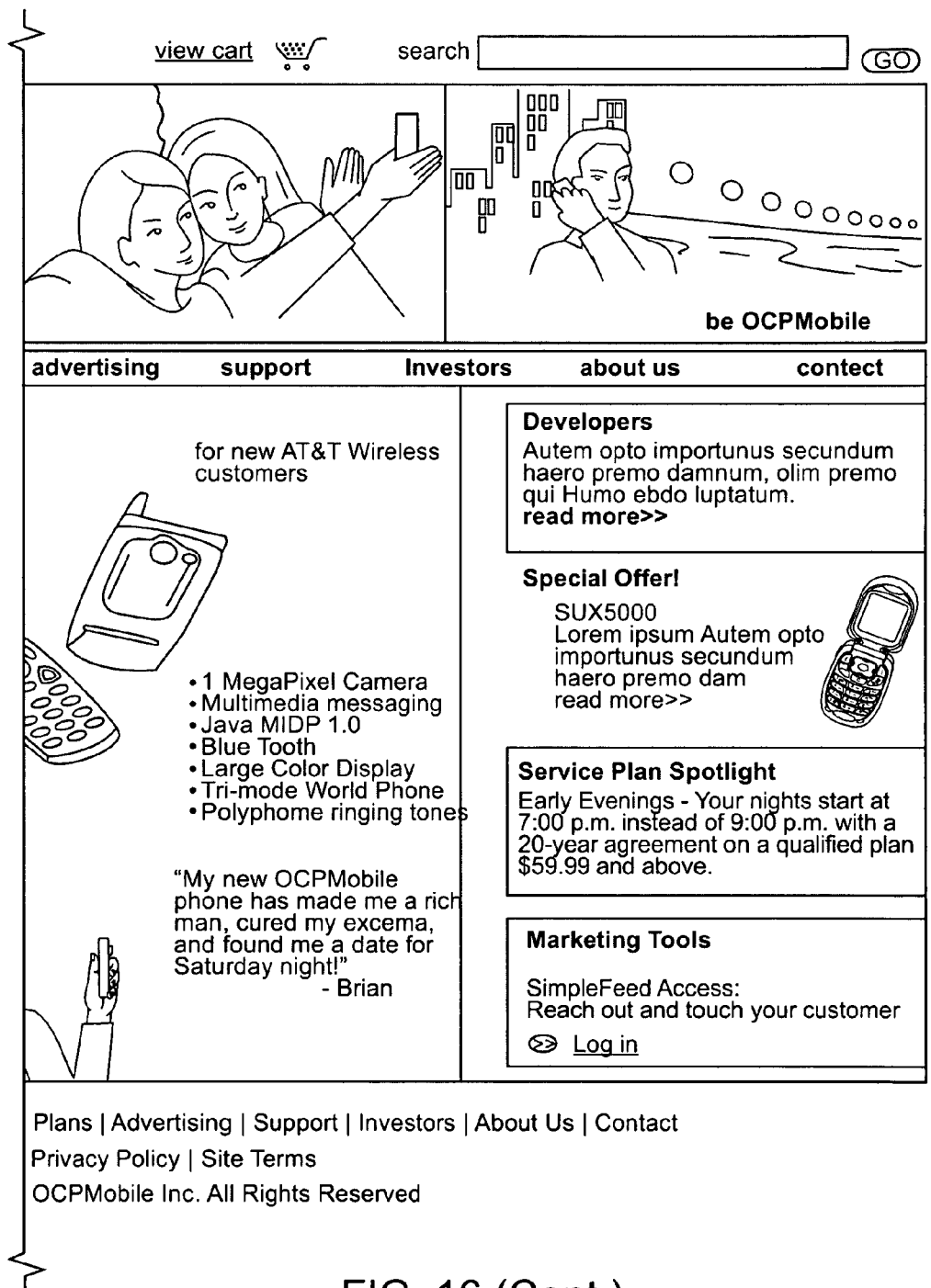
FIG. 16 illustrates one embodiment of the screenshot of an exemplary web page that supports personalized feeds in accordance with the present invention.
Figure 17:
FIG. 17 illustrates one embodiment of the screenshot of an exemplary web page that displays an XML icon indicating the availability of feeds in accordance with an embodiment of the present invention.
Figure 17:
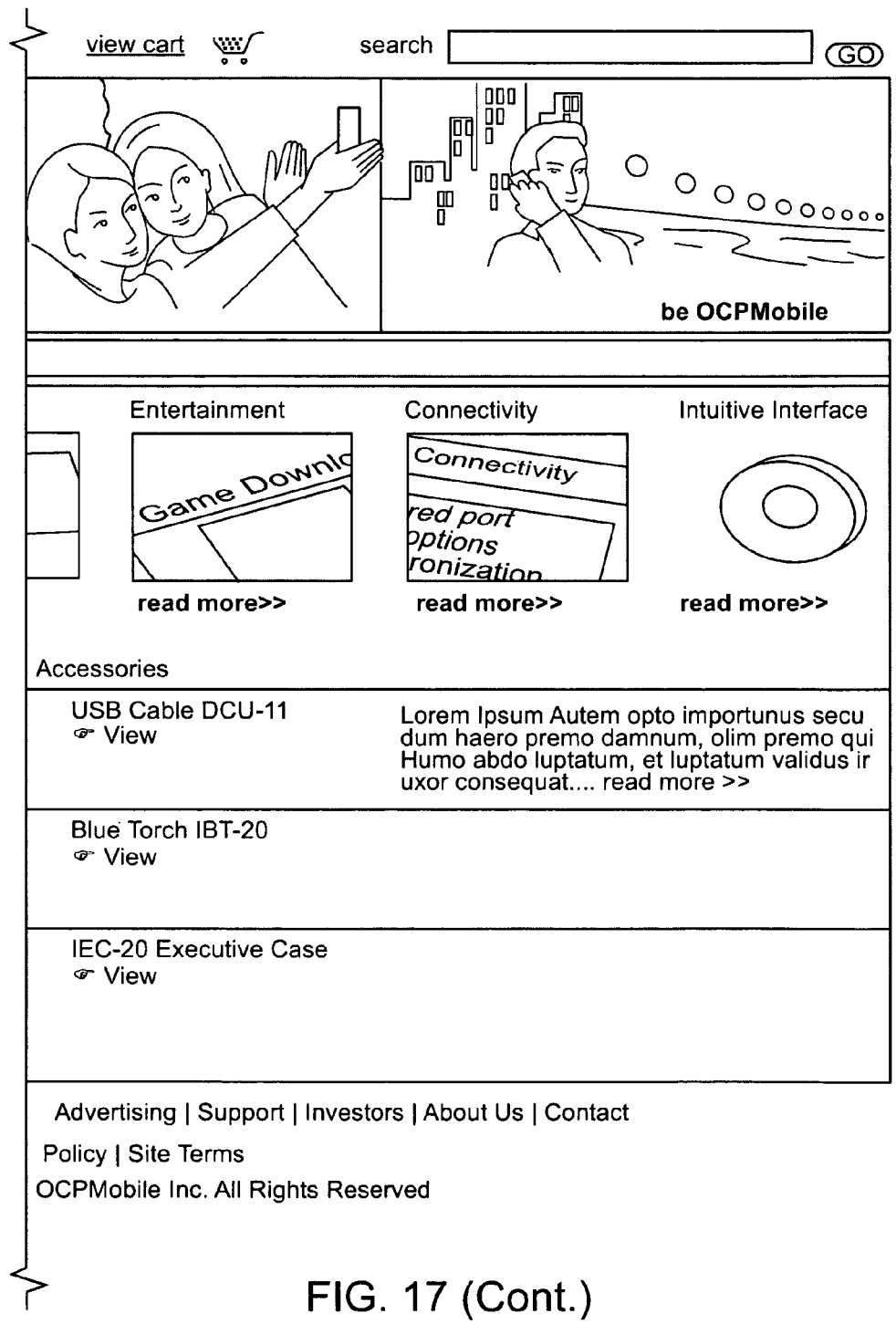
Figure 18:
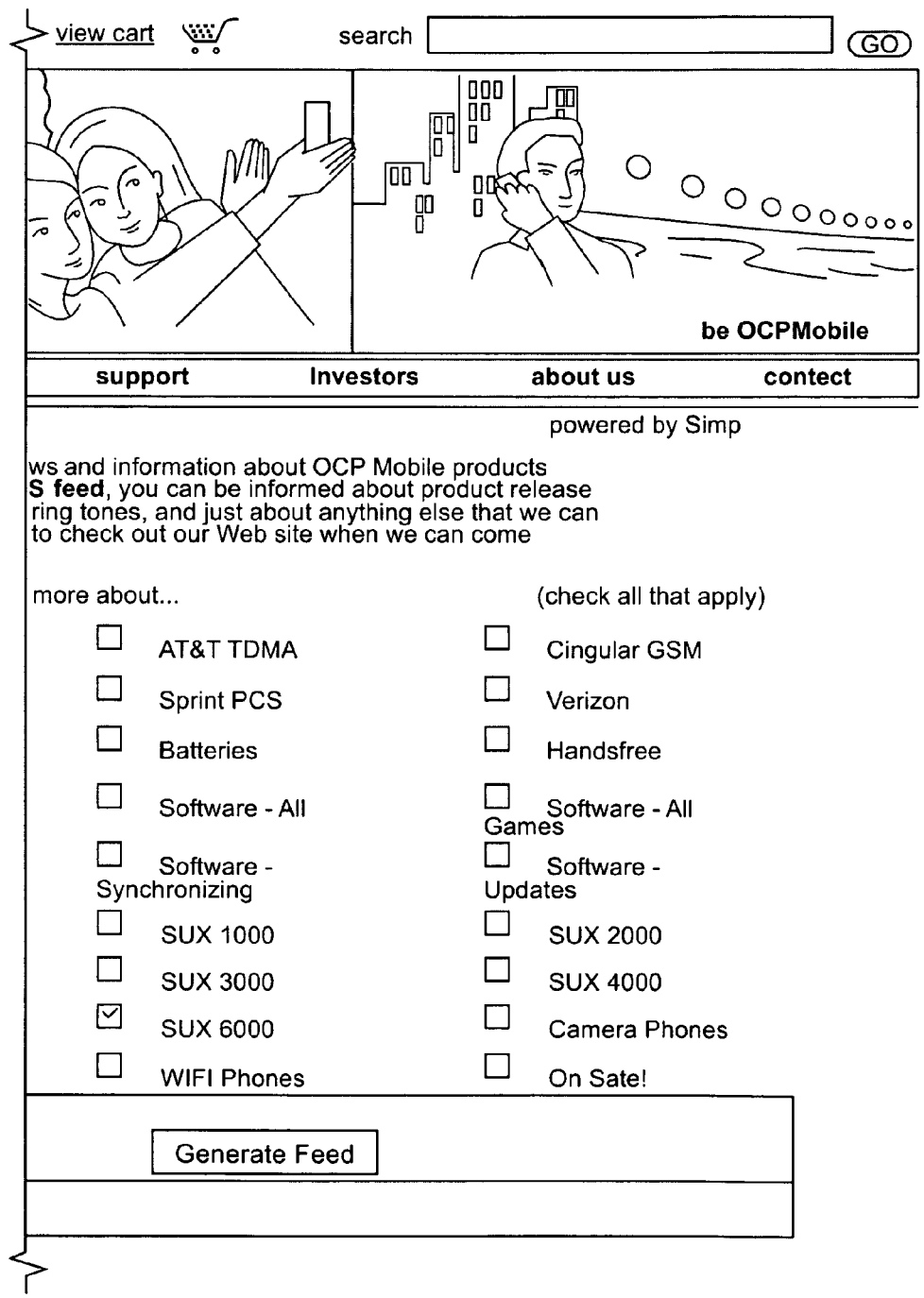
FIG. 18 illustrates one embodiment of the screenshot of an exemplary web page displaying customization content in accordance with the present invention.

FIG. 16 illustrates the screenshot of an exemplary web page that supports personalized feeds. In response to the user 104 clicking on the product promotion on this exemplary web page, the user 104 is directed to another exemplary web page illustrated in FIG. 17, which displays an XML icon indicating the availability of feeds. If the user 104 clicks on the XML icon, he or she is directed to another exemplary web page displaying customization content, as illustrated in FIG. 18. The user 104 can select his or her categories of interest at this web page by checking the appropriate checkboxes.

Figure 19:
FIG. 19 illustrates one embodiment of the screenshot of an exemplary web page providing a unique identifier from which a user can access a personalized feed in accordance with the present invention.
Figure 19:
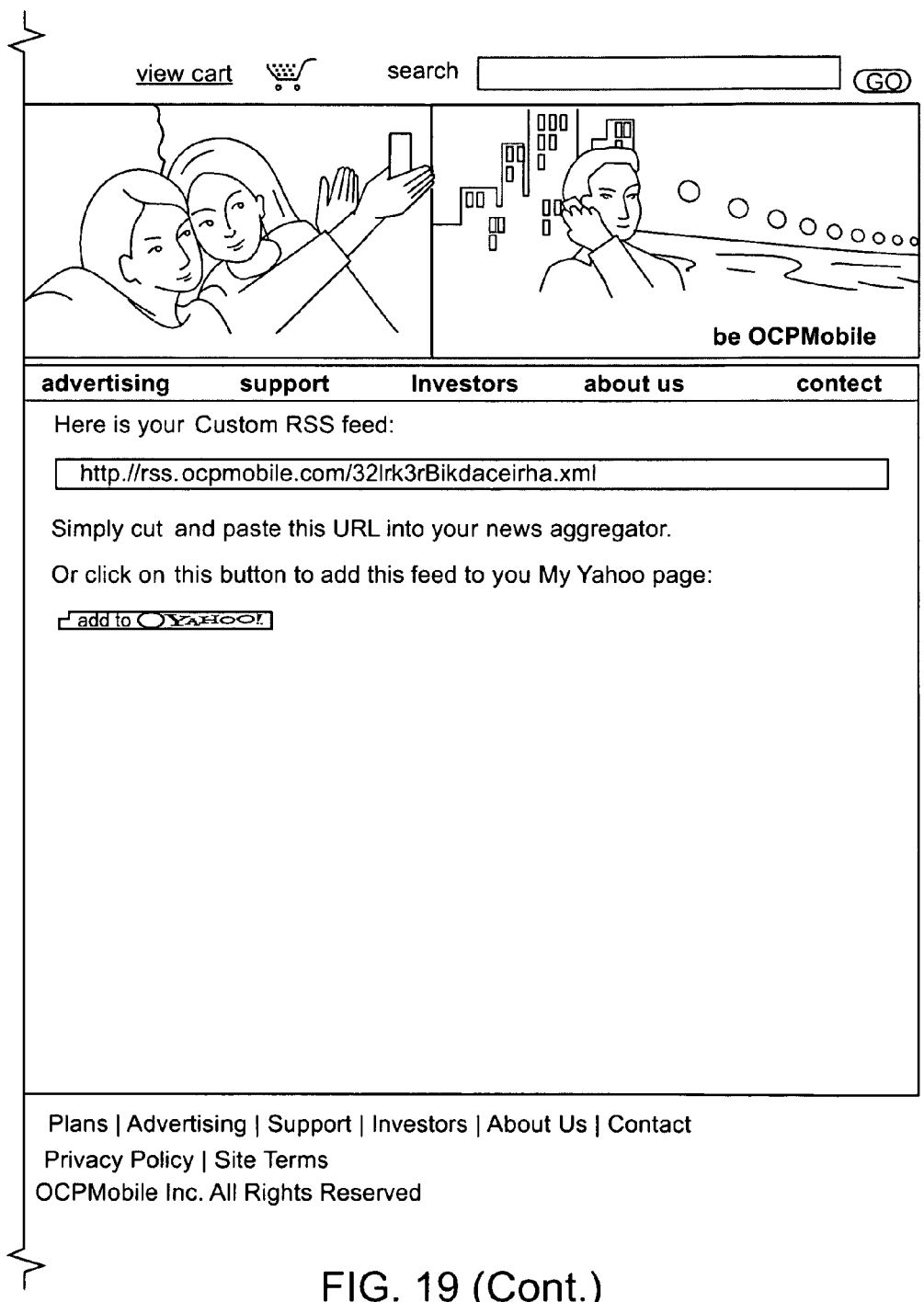

In response to the user 104 submitting his or her categories of interest, a web page is displayed to the user 104, as shown in FIG. 19. This web page provides a unique identifier such as a unique URL from which the user 104 can access a feed that has been personalized according to the interests of the user 104. The exemplary web page shown in FIG. 19 also displays an "add to MyYahoo" icon. If the user 104 clicks on the "add to MyYahoo" icon, the user 104 is directed to his or her MyYahoo page, which is a popular third-party Internet portal. The personalized feed content is automatically added to the MyYahoo page of the user 104. In an embodiment of the invention, other third-party Internet portals may be used instead of MyYahoo to provide personalized feed content to the user 104.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to memory 406. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for generating and formatting personalized feeds through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method, executed within at least one computing device, of automatically generating a feed from structured or unstructured data, the method comprising:
   receiving a request for the feed, the feed further comprising dynamically generated information with extensible markup language tags, the feed representing a plurality of content items packaged into a container format, each content item having a same pre-specified structure, the container format suitable for processing by a feed aggregator application for aggregating feed contents;
   identifying a user based on information received in the request;
   selecting one or more content sources relevant to the user from a plurality of content sources based on relative scoring of the one or more content sources;
   identifying a resource having a plurality of data elements, the resource further comprising content relevant to the user obtained from the one or more selected content sources, the data elements being represented as the structured or unstructured data;
   identifying a template including a plurality of fields from a plurality of templates structured for generating the plurality of content items for the feed, wherein the identifying the template is based on information associated with the user and a source of the structured or unstructured data, and identifying the template further comprises searching for a template that includes fields for integrating media based on the content of the media;
   matching the resource with the identified template, and using the identified template to extract the plurality of data elements from the resource for generating the plurality of content items, each extracted data element corresponding to a field of the plurality of fields in the identified template; and
   merging each extracted data element into a corresponding field of the plurality of fields in the identified template to generate the plurality of content items for the feed for transmission through a network;
   evaluating whether a predetermined quality of network service level is present and responsive to the presence, determining whether the transmission of the feed shall be delayed; and
   transmitting the feed to the user based on the determination whether the transmission of the feed shall be delayed.

2. The method of claim 1, wherein identifying the resource further comprises crawling a plurality of resource stores to extract the resource.

3. The method of claim 2, wherein the plurality of resource stores comprise at least one web site.

4. The method of claim 1, wherein identifying the resource further comprises one of receiving a manually entered resource and receiving the resource through an application programming interface.

5. The method of claim 1, wherein identifying the resource further comprises receiving an updated resource from a content source.

6. The method of claim 1, wherein the resource comprises one from a group consisting of a web page, an email, a document, a partial or complete video stream, a partial or complete audio stream, a graphic, database, and content management system (CMS).

7. The method of claim 1, wherein the resource is requested and processed after the user made the request for the feed that contains the requested resource.

8. The method of claim 1, wherein the feed is a rich site summary (RSS) feed.

9. The method of claim 1, further comprising processing the resource into the content based on rules in at least one of an internal source, an external source and an application programming interface.

10. The method of claim 1, wherein the relative scoring of the one or more content sources is based on historical data associated with the user.

11. The method of claim 1, wherein the relative scoring of the one or more content sources is based on historical data associated with each content source in the one or more content sources.

12. The method of claim 1, wherein the relative scoring of the one or more content sources is based on runtime statistics associated with c the one or more content sources.

13. The method of claim 1, wherein the relative scoring of the one or more content sources is based on popularity of the one or more content sources.

14. The method of claim 1, wherein the relative scoring of the one or more content sources is based on a time of update of each content source in the one or more content sources.

15. The method of claim 1, further comprising:
responsive to the determining that the feed shall be delayed, sending information regarding delay of delivery of the delayed feed; and
receiving repeated requests for delivery of the delayed feed until the delayed feed is delivered.

16. The method of claim 15, further comprising:
determining that the delayed feed being deliverable, responsive to a timeout exceeding a threshold value.

17. The method of claim 15, further comprising:
determining that the delayed feed being deliverable, responsive to a number of repeated requests for delivery of the delayed feed exceeding a threshold value.

18. The method of claim 1, wherein selecting the template comprises searching for a template that includes fields for integrating a media stream based on identification of portions of media stream having a predetermined characteristic.

19. The method of claim 1, wherein selecting the template comprises searching for a template that includes fields for integrating audio streams based on identification of silence of a predetermined length.

20. The method of claim 1, wherein selecting the template comprises searching for a template that includes fields for integrating video streams based on identification of blank frames of predetermined length or time duration.

21. A system for automatically generating a feed from resource, the system comprising:
a computer processor; and
a non-transitory computer-readable storage medium storing computer program modules configured to execute on the computer processor, the computer program modules comprising:
a receiver adapted to:
receive a request for the feed, the feed further comprising dynamically generated information with extensible markup language tags, the feed representing a plurality of content items packaged into a container format, each content item having a same pre-specified structure, the container format suitable for processing by a feed aggregator application for aggregating feed contents;
identify a user based on information received in the request;
select one or more content sources relevant to the user from a plurality of content sources based on relative scoring of the one or more content sources;
identify a resource having a plurality of data elements, the resource further comprising content relevant to the user obtained from the one or more selected content sources, the data elements being represented as structured or unstructured data;
a formatting database adapted to store a plurality of templates, each template contains a feed structure including a plurality of fields;
a rules engine adapted to:
identifying a template including a plurality of fields from the plurality of templates structured for generating the plurality of content items for the feed, wherein the template is identified based on information associated with the user and a source of the structured or unstructured data, and identifying the template further comprises searching for a template that includes fields for integrating media based on the content of the media; and
apply a rule for matching the resource with the identified template; and
a resource analyzer adapted to:
identify the respective plurality of fields in the identified template,
use the identified template to extract data elements from the resource corresponding to fields of the respective plurality of fields in the identified template for generating the plurality of content items, and
merge the extracted data elements into the corresponding fields of the plurality of fields in the identified template to generate the plurality of content items for the feed for transmission through a network;
evaluate whether a predetermined quality of network service level is present and responsive to the presence, determine whether the transmission of the feed shall be delayed; and
transmitting the feed to the user based on the determination whether the transmission of the feed shall be delayed.

22. The system of claim 21, further comprising a crawler adapted to crawl a plurality of resources and to transmit an updated resource to the receiver.

23. The system of claim 22, wherein the rules engine is further adapted to transmit to the crawler rules to crawl resources.

24. The system of claim 21, further comprising one of an input mechanism adapted to receive a manual input and an application programming interface adapted to receive an input from an application.

25. The system of claim 21, wherein the resource comprises one from a group consisting of a web page, an email, a document, a partial or complete video stream, a partial or complete audio stream, a graphic, database, and content management system (CMS).

26. The system of claim 21, wherein the rules engine is further adapted to transmit to the resource analyzer rules to extract the data elements from the resource.

27. The system of claim 21, wherein the resource is requested and processed after the user made the request for the feed that contains the requested resource.

28. The system of claim 21, wherein the feed is a rich site summary (RSS) feed.

29. The system of claim 21, further comprising processing the resource into the content based on rules in at least one of an internal source, an external source and an application programming interface.

30. A non-transitory computer readable storage medium, adapted to store instructions executable by at least one computer processor, the instructions configured to have the at least one computer processor automatically generate a feed from structured or unstructured data by:

receiving a request for the feed, the feed further comprising dynamically generated information with extensible markup language tags, the feed representing a plurality of content items packaged into a container format, each content item having a same pre-specified structure, the container format suitable for processing by a feed aggregator application for aggregating feed contents;

identifying a user based on information received in the request;

selecting one or more content sources relevant to the user from a plurality of content sources based on relative scoring of the one or more content sources;

identifying a resource having a plurality of data elements, the resource further comprising content relevant to the user obtained from the one or more selected content sources, the data elements being represented as the structured or unstructured data;

identifying a template including a plurality of fields from a plurality of templates structured for generating the plurality of content items for the feed, wherein the identifying the template is based on information associated with the user and a source of the structured or unstructured data, and identifying the template further comprises searching for a template that includes fields for integrating media based on the content of the media;

matching the resource with the identified template, and using the identified template to extract the plurality of data elements from the resource for generating the plurality of content items, each extracted data element corresponding to a field of the plurality of fields in the identified template;

merging each extracted data element into a corresponding field of the plurality of fields in the identified template to generate the plurality of content items for the feed for transmission through a network;

evaluating whether a predetermined quality of network service level is present and responsive to the presence, determining whether the transmission of the feed shall be delayed; and transmitting the feed to the user based on the determination whether the transmission of the feed shall be delayed.

31. The computer readable medium of claim 30, wherein the identifying the resource further comprises instructions for crawling a plurality of resource stores to extract the resource.

32. The computer readable medium of claim 31, wherein the plurality of resource stores comprise at least one web site.

33. The computer readable medium of claim 30, wherein the identifying the resource further comprises instructions for one of receiving a manually entered resource and receiving the resource through an application programming interface.

34. The computer readable medium of claim 30, wherein the resource comprises one from a group consisting of a web page, an email, a document, a partial or complete video stream, a partial or complete audio stream, a graphic, database, and content management system (CMS).

35. The computer readable medium of claim 30, wherein the feed is a rich site summary (RSS) feed.

36. The computer readable medium of claim 30, further comprising instructions for processing the resource into the content based on rules in at least one of an internal source, an external source and an application programming interface.

* * * * *